(12) United States Patent
Witkowski et al.

(10) Patent No.: US 7,333,485 B2
(45) Date of Patent: Feb. 19, 2008

(54) NETWORK COMMUNICATION DEVICE INCLUDING BONDED PORTS FOR INCREASED BANDWIDTH

(75) Inventors: Michael L. Witkowski, Harris County, TX (US); Dale J. Mayer, Harris County, TX (US); William J. Walker, Harris County, TX (US); Kirk D. Roller, Travis County, TX (US); Patricia E. Hareski, Harris County, TX (US); Gary B. Kotzur, Harris County, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 806 days.

(21) Appl. No.: 10/667,649

(22) Filed: Sep. 22, 2003

(65) Prior Publication Data

US 2004/0068589 A1  Apr. 8, 2004

Related U.S. Application Data

(60) Division of application No. 08/936,072, filed on Sep. 23, 1997, now Pat. No. 6,665,733, which is a continuation-in-part of application No. 08/774,605, filed on Dec. 30, 1996, now Pat. No. 6,260,073.

(51) Int. Cl.
*H04L 12/28* (2006.01)

(52) U.S. Cl. ..................................... 370/389

(58) Field of Classification Search ................ 370/389; 709/249
See application file for complete search history.

(56) References Cited

U.S. PATENT DOCUMENTS 3,723,973 A  3/1973  Kennedy (Continued)

OTHER PUBLICATIONS

Evaluating Port-Switching Hubs (A reality check for virtual workgroups), Data Comm Lab Test/Port, 8178 Data Communications, No. 9, New York, U.S., Jun. 22, 1993, pp. 52-56, 58, 60, and 62.

*Primary Examiner*—Wing Chan
*Assistant Examiner*—Lawrence J Burrowes

(57) ABSTRACT

A network communication device including port control circuitry for controlling packet flow between the ports of the device, where the port control circuitry includes a port manager that directs packets between the ports and port bonding circuitry that bonds two or more of the ports into a bonded port set. For each packet to be sent via the bonded port set, the port bonding circuitry selects one of the bonded ports for transmitting the packet. More than one bonded port set may be defined in a given communication device, and each bonded port set may include from two ports up to all the ports of the device, as long as each port is included in only one bonded port set. One or more port bonding registers are provided to identify which of the plurality of ports are bonded in each bonded port set. In one embodiment, the bonded ports are selected on a packet by packet basis so as to achieve a relatively even distribution of packets sent by each bonded port. In an alternative embodiment bonded ports are assigned to packet source identifiers so as to achieve a relatively even distribution of source identifiers among the bonded ports. If bonded ports are assigned to particular source identifiers, then the traffic is preferably monitored and the assignments are periodically adjusted to achieve even distribution of packet flow on the bonded link. The bonded ports may have different bandwidths, in which case traffic is distributed on a proportionate basis.

9 Claims, 13 Drawing Sheets

U.S. PATENT DOCUMENTS

| | | | |
|---|---|---|---|
| 4,521,879 A * | 6/1985 | Gueldenpfennig et al. .. 370/267 |
| 4,897,841 A | 1/1990 | Gang, Jr. |
| 5,130,975 A | 7/1992 | Akata |
| 5,193,149 A | 3/1993 | Awiszio et al. |
| 5,241,587 A | 8/1993 | Horton et al. |
| 5,291,479 A | 3/1994 | Vaziri et al. |
| 5,293,486 A | 3/1994 | Jordan et al. |
| 5,309,426 A | 5/1994 | Crouse et al. |
| 5,412,653 A | 5/1995 | Hoppe et al. |
| 5,430,726 A | 7/1995 | Moorwood et al. |
| 5,490,252 A | 2/1996 | Macera et al. |
| 5,515,376 A | 5/1996 | Murthy et al. |
| 5,546,385 A | 8/1996 | Caspi et al. |
| 5,561,669 A | 10/1996 | Lenney et al. |
| 5,592,472 A | 1/1997 | Grant et al. |
| 5,625,846 A | 4/1997 | Kobayakawa et al. |
| 5,682,484 A | 10/1997 | Lambrecht |
| 5,732,087 A | 3/1998 | Lauer et al. |
| 5,737,525 A | 4/1998 | Picazo, Jr. et al. |
| 5,742,587 A | 4/1998 | Zornig et al. |
| 5,748,629 A | 5/1998 | Caldara et al. |
| 5,856,999 A | 1/1999 | Robinson et al. |
| 5,862,338 A | 1/1999 | Walker et al. |
| 6,098,109 A | 8/2000 | Kotzur et al. |
| 6,098,110 A | 8/2000 | Witkowski et al. |
| 6,201,789 B1 | 3/2001 | Witkowski et al. |
| 6,260,073 B1 * | 7/2001 | Walker et al. ............... 709/249 |
| 6,665,733 B1 * | 12/2003 | Witkowski et al. ......... 709/249 |

* cited by examiner

Hash Memory Organization

| Link A31-24 | Link A23-16 | Link A15-8 | Link A7-4,000 | Byte15-12 |
|---|---|---|---|---|
| VLAN byte 3 | VLAN Byte 2 | VLAN Byte 1 | VLAN Byte 0 | Byte11-8 |
| Control / Age | Port Num | Address Byte 5 | Address Byte 4 | Byte 7-4 |
| Address Byte 3 | Address Byte 2 | Address Byte 1 | Address Byte 0 | Byte 3-0 |

NETWORK COMMUNICATION DEVICE INCLUDING BONDED PORTS FOR INCREASED BANDWIDTH

CROSS REFERENCE TO RELATED APPLICATIONS

The present application is a divisional of application Ser. No. 08/936,072 filed on Sep. 23, 1997 now U.S. Pat. No. 6,665,733, is a continuation-in-part of U.S. application Ser. No. 08/774,605 filed Dec. 30, 1996 now U.S. Pat. No. 6,260,073, which is hereby incorporated herein by reference in its entirety.

FIELD OF THE INVENTION

The present invention relates generally to networks, and more specifically, to a network communication device with port bonding architecture that enables multiple ports to be bonded together to provide a higher bandwidth connection between any two devices in a network system.

DESCRIPTION OF THE RELATED ART

Network communication devices are available in a variety of configurations and throughputs to provide connectivity between multiple network devices such as computers, servers, DTEs etc. A switch, for example, provides a significant advantage over other network communication devices, such as repeaters or hubs, by learning media access control (MAC) addresses of network devices and reducing extraneous packet transmissions. MAC addresses are assigned to network devices and are unique in the industry to distinguish one device from the next. Multiple switches may be included to expand the number of network devices in a given network system. However, redundant connection paths between any two network devices or between two or more network communication devices result in packet looping. Packet looping is undesirable because it causes the generation of duplicate packets and/or broadcast storms. Significant packet looping eventually results in an excessive number of dropped packets and drastically reduced performance of a network.

The spanning tree algorithm was invented to locate all connection paths between resources on the network and disable redundant connection paths to avoid packet looping problems. Although a redundant link may be included between any two devices, the redundant link is typically only used to serve as a backup link if the primary link fails or otherwise becomes unusable.

While network communication devices enabled connection of multiple computers to one or more servers, the spanning tree algorithm allowed only one valid path at a time between any computer and a server. If multiple computers coupled to one server via a common link between two network communication devices attempted to access that server at the same time, the traffic demand of that link often became greater than its available bandwidth, thereby overwhelming the link. This usually resulted in dropped packets, disrupted connections and repeated packet transmission attempts. The common link therefore was a bottleneck between the two network communication devices.

It is desired to increase the available bandwidth between any two network communication devices without substantial modification and without increasing the bandwidth of any given port.

SUMMARY OF THE INVENTION

A network communication device according to the present invention includes a plurality of ports that are each used to receive and transmit packets of data and port control circuitry for controlling packet flow between the ports. The port control circuitry includes a port manager that directs packets between the ports and port bonding circuitry that bonds two or more of the ports into a bonded port set. For each packet to be sent via the bonded port set, the port bonding circuitry selects one of the bonded ports for transmitting the packet. More than one bonded port set may be defined in a given communication device, and each bonded port set may include from two ports up to all the ports of the communication devices, as long as each port is included in only one bonded port set. One or more port bonding registers are preferably provided to identify which of the plurality of ports in the network communication device are bonded in each bonded port set. The present invention is applicable to and is illustrated using network switches, although the present invention is applicable to other network communication devices as well.

In one embodiment, the bonded ports are selected on a packet by packet basis so as to achieve a relatively even distribution of packets sent by each bonded port in the bonded port set. A memory is preferably included in which the port control circuitry stores a plurality of entries, where each entry includes a source identifier provided in each packet and a corresponding port identifier. The source identifier is typically a MAC address of a sending device to uniquely identify that device. If bonded ports are selected for transmission on a packet by packet basis, then for packets received at any of the bonded ports of the bonded port set, the port bonding circuitry programs the corresponding port identifier to represent the bonded port set in general. In this manner, when a packet is received by the communication device to be sent out the bonded port set, such as a unicast packet with a destination identifier that is equivalent to a source identifier received at a bonded port, the communication device dynamically selects any one of the bonded ports in order to achieve an even distribution of traffic on the bonded port set. Such dynamic selection on a packet by packet basis ensures even traffic distribution but may result in overhead associated with each packet.

In an alternative embodiment, for each entry in the memory that includes a source identifier that was received at any bonded port of the bonded port set, the port bonding circuitry programs the port identifier to identify one bonded port of the bonded port set so as to achieve a relatively even distribution of source identifiers among the bonded ports of the bonded port set. Thus, each source identifier received at the bonded port set is assigned to a particular bonded port of the bonded port set. The selected bonded port is not necessarily the same port at which the packet was received. Instead, selection is made to achieve relative distribution of identifiers among the bonded ports. In this manner, every unicast packet received by the communication device specifying a destination identifier equivalent to the source identifier is sent via the same selected bonded port of the bonded port set.

Assignment of source identifiers to particular bonded ports and approximately even distribution of source identifiers among bonded ports is based on the assumption that each device generates approximately the same amount of traffic over time. In operation, a traffic imbalance may result so that one bonded port is carrying a disproportionate amount of traffic. In an optional embodiment, the port bonding circuitry monitors unicast packets sent via each bonded port of the banded port set and periodically reprograms the port identifier of each of the plurality of entries in the memory so as to achieve a relatively even distribution of unicast packet traffic among the bonded ports of the bonded port set. In this manner, the bonded port assignments are dynamically adjusted.

In another embodiment according to the present invention including VLAN capabilities, each of the entries in the memory that has a source identifier that was received at any non-bonded port includes a bit map having a bit corresponding to each of the bonded ports. The bit maps are particularly useful for broadcast and multicast packet handling and to distribute broadcast and multicast packets on bonded port sets. The port bonding circuitry programs each bit map of each of the plurality of entries to assign one bonded port of the bonded port set so as to achieve a relatively even distribution of bonded port assignments to source identifiers corresponding to non-bonded ports. Additionally, the memory may include a default bit map table that includes a default bit map for each of the plurality of ports for source MAC addresses that have not been learned. In this case, each of the default bit maps include a bit corresponding to each of the bonded ports and the port bonding circuitry programs each of the default bit maps to assign one bonded port of the bonded port set so as to achieve a relatively even distribution of bonded port assignments among the plurality of ports.

In the case of broadcast packets that are received from non-bonded ports and send to bonded ports as determined by the port control circuitry, the port bonding circuitry of the communication device monitors those packets sent by each bonded port of the bonded port set and periodically reprograms each bit map of each of the plurality of entries so as to achieve a relatively even distribution of broadcast packet traffic among the bonded ports of the bonded port set.

A packet-based network system according to the present invention includes at least two network communication devices, each including a bonded port set including at least two bonded ports. A bonded link is coupled between the bonded port sets of the respective communication devices, where the bonded link includes a connection link between respective bonded ports of the two devices. For each packet received by either device to be sent to the other via the bonded link, each device selects one of its bonded ports. Such selection is made to evenly distribute packets on the bonded port link assuming each of the bonded ports operation at the same speed or a the same bandwidth. As before, the selection of bonded ports may be made on a packet by packet basis or by assigning a bonded port to each source identifier. If bonded ports are assigned, a communication device evenly assigns source identifiers received by its bonded ports among the bonded ports and evenly assigns bonded ports among the source identifiers received by its non-bonded ports. Such assignment may be random, round-robin, sequential, etc.

The bonded port sets between two communication devices may include bonded ports operating at different speeds or different bandwidths. If so, the devices coupled together via a bonded link each attempt to distribute traffic on the bonded link in proportion to the bandwidths of the bonded ports. Also, a network system according to the present invention may include multiple devices and multiple bonded port sets between respective devices. Thus, a device may have multiple bonded port sets, each having any number of bonded ports, as long as only one bonded link is established between any two devices.

A method according to the present invention includes steps of defining at least two ports as bonded ports forming a bonded port set, receiving a packet, determining that the received packet is to be sent via the bonded port set, selecting one of the bonded ports, and sending the packet via the selected bonded port. If a spanning tree function is applicable, a further step of modifying the spanning tree function to prevent disabling any of the bonded ports may be performed.

It is appreciated that a network communication device with bonded ports according to the present invention enables a higher bandwidth capability between any two devices as compared to a single connection. Any number of bonded ports may be included in a bonded link between two communication devices to increase the available bandwidth by a proportional amount. Each device treats its bonded port set as though it were a single port. Thus, to avoid packet looping, each packet is sent via only one of the bonded ports and packets received at one bonded port are not re-transmitted on another bonded port of the same bonded port set. To achieve the highest bandwidth possible on the bonded link, each device distributes traffic on each bonded port as evenly as possible. The traffic distribution depends on the selection criterion for selecting bonded ports, where any one of several methods may be used, such as random, round-robin, etc. The selection of a bonded port to send a packet is made either on a packet by packet basis or by source identifier (MAC address) assignment as previously described. In the assignment embodiment, the traffic may be dynamically monitored and the assignments periodically adjusted to achieve the highest bandwidth on each bonded link.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
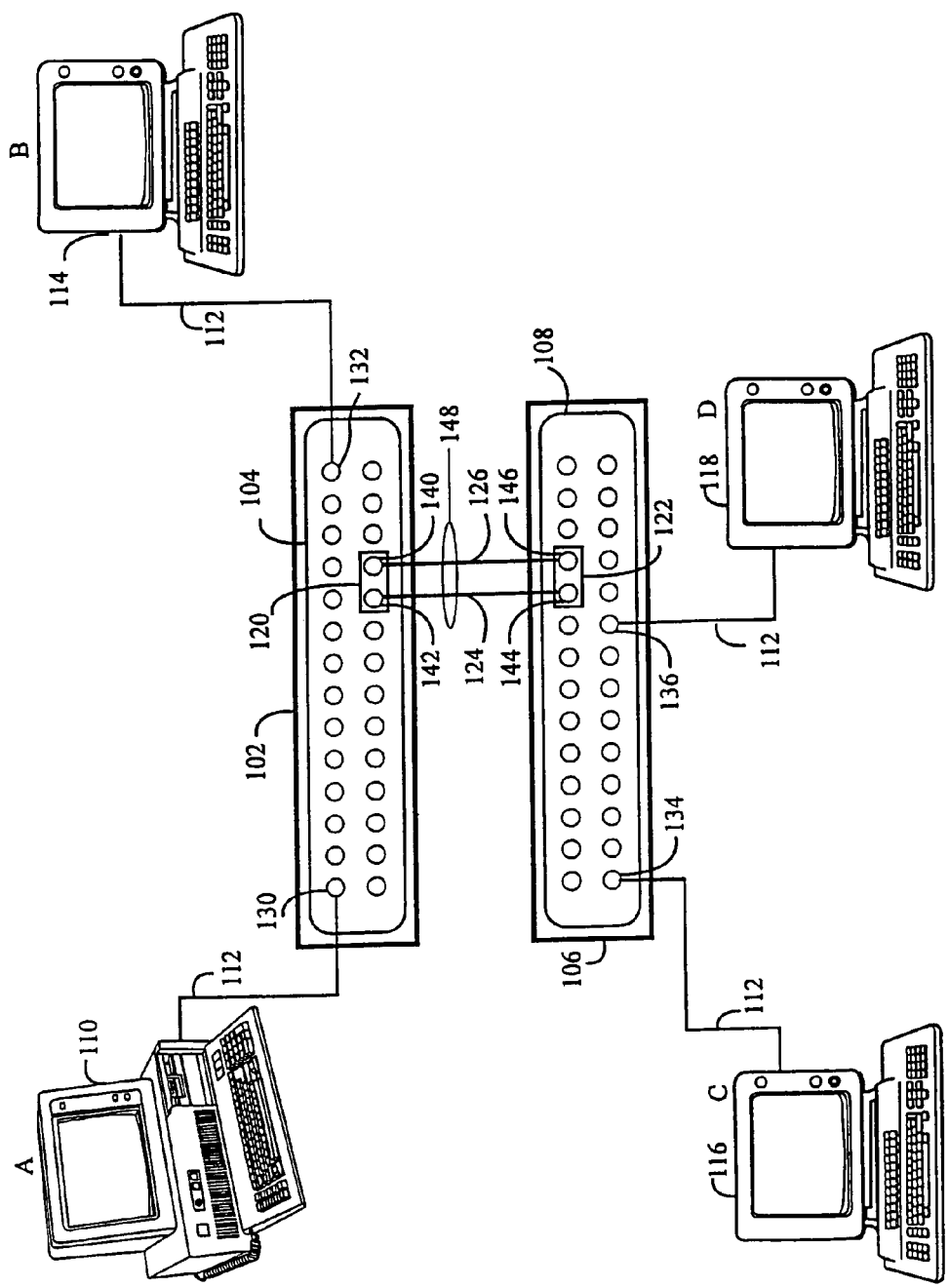
FIG. 1 is a simplified block diagram of a network system including bonded ports between two network switches implemented according to the present invention.

Referring now to FIG. 1, a simplified block diagram of a network system 100 is shown including bonded ports according to the present invention between two network switches 102, 106. Port bonding involves bonding two or more ports together into a bonded port set and treating the bonded port set as though it were a single port, except that traffic flow is allowed on each of the bonded ports. A bonded port set of one switch is coupled, port by port, to a corresponding bonded port set of another switch, thereby creating a combined bonded link or "fat pipe" between the two switches. The spanning tree algorithm is modified in each of the switches 102, 106 to prevent disabling any of the bonded ports, and packet looping is avoided by sending each packet out only one bonded port. Also, packets received at any bonded port are not forwarded to the other bonded ports in the same bonded port set. In this manner, a bonded link provides a larger bandwidth for communication between the switches than would otherwise be possible without port bonding.

In the embodiments described herein, each switch may support any number of bonded port sets although a bonded link is provided only between two switches. In general, each bonded port set may include any subset of all the ports up to the full number of switch ports. However, a port may be included in only one bonded port set. It is noted that the present invention is illustrated herein using switches. However, the concepts of redundant ports and port bonding is equally applicable to network communication devices other than switches.

With reference to FIG. 1, the network system 100 includes four network devices 110, 114, 116, and 118, which are assigned MAC addresses A, B, C and D, respectively. Each of the network switches 102 and 106 include a plurality of ports, each for receiving and transmitting data. In particular, the network switch 102 includes a plurality of ports 104 and the network switch 106 includes a plurality of ports 108. The ports 104, 108 may all be of the same type and operate at the same speed. Alternatively, the ports 104, 108 may include a combination of different port types and speeds. For example, some ports may operate according to Ethernet 10Base-T at 10 megabits per second (Mbps) while others operate at 100 Mbps or at both speeds 10/100. The present invention is not limited by the particular type or speed of the ports.

Each of the network devices 110, 114, 116, and 118 may be personal or laptop computers with network interface cards (NICs), servers, data terminal equipment devices (DTEs), network controllers, or any other types of network devices. The network devices 110, 114, 116 and 118 are coupled to ports 130, 132, 134 and 136, respectively, via corresponding links 112. The links 112 may be any appropriate kinds of transmission media including cables typically used for connecting network devices in a typical network. For example, the links 112 could be twisted pair cables with RJ-45 connectors if the network system 100 is based on the Ethernet architecture. The links 112 may also include remote and/or wireless connections.

The network system 100 may be a local area network (LAN), a wide area network (WAN) or any other kind of network and may be based on Ethernet, Token Ring, ATM or any other network architecture known to those skilled in the art. In the embodiment shown, the network system 100 is a shared media network that communicates data in the form of packets, where each of the devices 110, 114, 116 and 118 and the network switches 102, 106 communicate by sending and receiving packets. Each packet may be unicast, multicast, or broadcast. Unicast packets typically include a source identifier or address identifying the sending device and a destination identifier or address identifying the intended destination device. The identifiers or addresses are preferably in the form of a MAC addresses, which are uniquely assigned to identify particular devices. Broadcast and multicast packets include a source address and are intended to be broadcast to all other devices in the network or to a particular subset thereof. Broadcast packets do not include a destination address, but has its group bit set to identify it as a broadcast packet. A multicast packet provides a source address along with one or more destination addresses and also has its group bit set. In the present disclosure, multicast and broadcast packets are treated the same.

The network switch 102 includes port control circuitry 154 coupled to each of its ports 104 for controlling traffic flow of the ports 104. The network switch 102 also includes port bonding circuitry 156 coupled to, or otherwise incorporated within, the port control circuitry 154. Likewise, the network switch 106 includes port control circuitry 150 coupled to each of its ports 108 for controlling data traffic, and port bonding circuitry 152 coupled to, or otherwise incorporated within, the port control circuitry 150. The port control circuitry 154, 150 manage the operation of the respective ports 104, 108 of the switches 102, 106 respectively, and the port bonding components 156, 152 contain port bonding information and facilitate port bonding for the switches 102, 106, respectively. Although shown as incorporated within the network switches 102, 106, the port bonding components 156, 152 may be external to the switches 102, 106 in an alternative embodiment.

An exemplary embodiment of 150, 152, 154, and 156 is shown and described with reference to FIG. 6.

The port control circuitry 154, 150 of each of the network switches 102 and 106 examine each packet received and performs filtering functions to reduce extraneous packet generation. In particular, each of the port control circuitry 154 and 150 examines each packet and "learns" the source MAC address of each received packet and associates or assigns that source address with the particular port through which the packet was received. Ports of a switch are identified in any desired manner, such as a port number. Thereafter, the port control circuitry 154, 150 examines the destination address, if any, of each packet and sends that packet to a destination port that corresponds to the learned MAC address. For example, when a packet is sent by the network device 110 to the port 130 with source MAC address A, the port control circuitry 154 of the network switch 102 learns the MAC address A and assigns the port number of the port 130 to the MAC address A. If the received packet includes a destination MAC address B designating the device 114, and if the port control circuitry 154 has already associated MAC address B with port 132, then network switch 102 forwards the packet to the port 132.

If, however, the destination MAC address for a received packet is not yet known to the port control circuitry 154, then the received packet is broadcast to all the other ports 104 or to all associated ports as further described below. Broadcasting the packet in this manner ensures that the intended destination device eventually receives the packet. Subsequently, when the network device associated with the unknown destination address responds by sending a packet of data with its own address as the source address in the packet, the port control circuitry 154 of the network switch 102 learns the MAC address and assigns it to the port through which the packet was received. For example, if the MAC address B is not known by the port control circuitry 154, the received packet is broadcast to the other ports 104 including the port 132, so that the device 114 receives the packet. The device 114 eventually responds by sending a packet with source MAC address B, so that the port control circuitry 154 learns MAC address B and assigns the port number of port 132 to MAC address B. If the packet includes destination MAC address A, then the switch 102 does not need to broadcast the packet but sends the packet via the port 130.

A network switch directly supports only a finite number of network devices since it is physically limited to a finite number of ports. Many switches, however, include one or more uplink ports for connecting to similar uplink ports of other network switches to expand the size of the network system. Nonetheless, such uplink connections were limited to the bandwidth of a single port since the spanning tree algorithm eliminated redundant links.

The network switch 102 includes a bonded port set 120 which includes two ports 140 and 142. The port bonding circuitry 156 facilitates operation to support the bonded port set 120. The network switch 106 also has a bonded port set 122 including two ports 144 and 146, where the port bonding circuitry 152 supports the bonded port set 122. The port 142 is coupled to the port 144 via a link 124 and the port 140 is coupled to the port 146 via a link 126. The pair of links 124, 126 is collectively referred to as a bonded link 148. Although the bonded link 148 shown in FIG. 1 couples only two ports of each network switch 102, 106, more than two ports could be included. If each bonded port of a bonded port set has a bandwidth of 100 Mbs at half duplex, then due to port bonding, the aggregate data bandwidth between the network switches 102, 106 via the bonded link 148 is 400 Mbs in full duplex mode. The port bonding circuitry 156, 152 of each of the network switches 102, 106, respectively, enable communication via the bonded port link 148 after the bonded link 148 is established.

The port control circuitry 154, 150 of each of the switches 102, 106, through operation of the port bonding circuitry 156, 152, treats its bonded port set 120, 122 as though it were a single port. To send a packet from the bonded port set 120, the switch 102 selects only one of the bonded ports 140, 142. This selection criterion enables the switch 102 to evenly distribute traffic on the bonded port set 120 to increase traffic throughput. The switch 102 learns or associates MAC addresses of packets received at its port of a bonded port set in one of two ways. A MAC address is assigned to either bonded port 140 or 142, or to the entire bonded port set 120. Such address assignments are primarily for the purpose of transmission rather than reception of packets. If the MAC address is assigned to a particular bonded port, the assignment does not have to be to the same port that received the packet. Subsequent packets with the same address may be received at any of the ports of the bonded port set without effecting the assignment. The switch 106, through operation of the port bonding circuitry 152, operates in a similar manner.

An example of port bonding operation is now described. Suppose the network device 110 sends a unicast packet to port 130 of the switch 102 with the source address A and a destination address C. If the switch 102 has not previously learned the address C, i.e. does not know the port number associated with the destination MAC address C, it broadcasts the packet to all the ports 104 other than the received port 130. Also, the switch 102 selects only one bonded port 140 or 142 of the bonded port set 120 to send the packet. As further described below, assignment to the bonded port set or to either bonded port describes two different modes of operation or two alternative embodiments. One goal of either embodiment is to distribute network traffic between the bonded ports evenly. In the embodiment shown, the switch 102 operates to assign MAC addresses to bonded port sets in general. Thus, the switch 102 assigns MAC address C to the bonded port set 120 rather than to either bonded port 140 or 142. In this manner, the determination of which bonded port 140 or 142 of the bonded port set 120 to use is made on a packet by packet basis.

Since it is typically desired to maintain proper ordering of the packets for each source port, however, the port control circuitry 154 and the port bonding circuitry 156 also ensure that the packets are and transmitted in the same order that they were received by respective ports. One method to ensure proper ordering is that the port control and port bonding circuitry 154, 156 alternatively assigns and distributes the packets between the bonded ports 140 and 142. For example, if the source address C is assigned by the switch 102 to the bonded port set 120, then a first packet with destination address C to be sent to the device 116 is assigned to bonded port 142, while the next packet with destination address C is assigned to bonded port 140, and so on. Assignment for three or more bonded ports is similar where traffic is evenly distributed, such as using a round-robin assignment of packets on a packet by packet basis.

The switch 102 also ensures that the packets are transmitted in the same order as received. How proper transmission order is achieved may depend upon the particular hardware configuration. It is not necessary to wait for a packet to be completely transmitted by one bonded port before sending the next packet on the other bonded port. It is sufficient that the switch 102 begins transmitting a prior packet on one port before initiating transmission of a subsequent packet on the next bonded port. For example, a single queue is defined for the entire bonded port set 120 and the packets are queued and transmitted in proper order. For the packet by packet embodiment, the network switch receiving packets on a bonded port set also maintains proper ordering of the packets. For example, a first packet received by the network switch 106 on port 144 addressed to the device 116 is sent to the device 116 before a next packet received by the port 146 also addressed to the device 116.

Suppose that the network switch 102 selects port 142. The switch 106 receives the packet with the source address A on the port 144 with the destination address C. If the switch 106 has not previously received a packet with the MAC address A, it assigns the MAC address A to the port set 122 or to either bonded port 144 or 146. The switch 106 operates to assign addresses to a particular bonded port of a bonded port set rather than to the bonded port set in general as described above for the network switch 102. In this alternative embodiment, the packets to be sent by the network switch 106 to a device with a given destination address via the bonded port set 122 are sent by the same bonded port to which that destination address has been assigned. This MAC assignment embodiment operates on the assumption that most devices generate roughly the same amount of packets, and has the inherent benefit in that packet ordering per source port is automatically maintained. As described further below, a switch operating using particular port assignments may dynamically alter assignments if traffic load is not distributed evenly.

In the embodiment shown, the switch 106 assigns the bonded port 146 to the MAC address A. If the network switch 106 does not know the destination MAC address C, it broadcasts the packet to all its ports 108 including the port 134 and excluding the ports 144, 146 of the bonded port set 122, since the bonded port set 122 is the source "port". The network device 116 thus receives the packet with address A. The network device 116 responds by sending a unicast packet to the switch 106 with the source address C and destination address A. The network switch 106 receives the packet at port 134 and assigns the MAC address C of the device 116 to the port 134. The network switch 106 determines that the MAC address A is assigned to the bonded port 146 and sends the packet to the switch 102 via port 144. The network switch 102 receives the packet at the bonded port set 120, assigns MAC address C, and then sends the packet via the port 130 for delivery to the network device 110. It is noted that any subsequent packets received by the switch 106 at any of the ports 108 other than the ports 144 and 146 with destination address A is sent via port 146 since assigned to MAC address A.

Since the network switch 102 transmits packets on a packet by packet basis, subsequent packets sent by either device 110 or 114 with destination address C are sent by switch 102 via either bonded port 140 or 142. Consequently, the switch 106 receives packets with destination MAC address C at either bonded port 144 or 146. The port control circuitry 150 of the switch 106, in cooperation with the port bonding circuitry 152, recognizes the fact that the ports 144 and 146 are included in the same bonded port set 122 and does not change the assignment of MAC address C. Also, suppose that the switch 106 assigns bonded port 144 to MAC address B. If device 118 sends two packets, each with source address D, including a first packet with destination address A and a second packet with destination address B, then the switch 106 sends the first packet via bonded port 146 and the second packet via port 144 to the switch 102. The switch 102 receives the two packets with source address D on two different bonded ports 140 and 142, respectively. Nonetheless, the port control circuitry 154 of the switch 102, in cooperation with the port bonding circuitry 156, recognizes the fact that the ports 140 and 142 are included in the same bonded port set 120 and does not change the assignment of MAC address D.

Port bonding according to the present invention effectively increases the bandwidth between any two switches by distributing packets among multiple bonded ports rather than a single port. For the network system 100 shown in FIG. 1, both of the switches 102 and 106 send each packet on either of the two bonded ports, which effectively doubles the throughput between the two network switches 102, 106 as compared to a single uplink port. A bonded port set including three ports effectively triples the throughput as compared to a single port.

The relative increase in bandwidth may depend upon the selection and assignment criterion. Assignment of addresses to bonded port sets in general provides the advantage that traffic is distributed on an incremental or a packet by packet basis, which assures even distribution of traffic. The assignment to particular ports provides the advantage that the port bonding circuitry 156 or 152 makes an initial selection determination, where port selection is primarily performed in hardware thereafter. Also, packet order per source port is automatically achieved in this embodiment without further logic or circuitry. However, specific bonded port assignment may result in uneven distribution in that some devices may generate significantly greater amounts of traffic than others. In the later case, dynamic monitoring and adjustment of assignments is then utilized to modify the assignments to obtain relatively equal traffic distribution among the bonded ports for each bonded port set.

Port bonding can be used in conjunction with the concept of virtual LAN (VLAN), which is employed to group ports or to group devices into one or more subset LANs. VLANs may be defined in several different ways, such as a VLAN bit map or group of bits that represent a VLAN. The membership of any specific port in a VLAN is represented by a corresponding bit in the VLAN bit map, which indicates whether the port is a member of that VLAN. Each port includes a VLAN bit map identifying VLAN membership. If VLAN capabilities are enabled, then a switch sends packets from one port in a VLAN only to other ports that are members of the same VLAN. In the embodiments described herein, VLANs are allowed to overlap, so that one or more ports may be included in two or more VLANs.

As described further below, VLAN bit maps may be used by the port bonding circuitry of a switch according to the present invention to assign bonded ports to MAC addresses for broadcast and destination miss packets. A VLAN may include multiple bonded port sets and each bonded port set may be included in more than one VLAN. If a VLAN includes one bonded port, then it effectively includes all of the bonded ports in that bonded port set.

Figure 2:
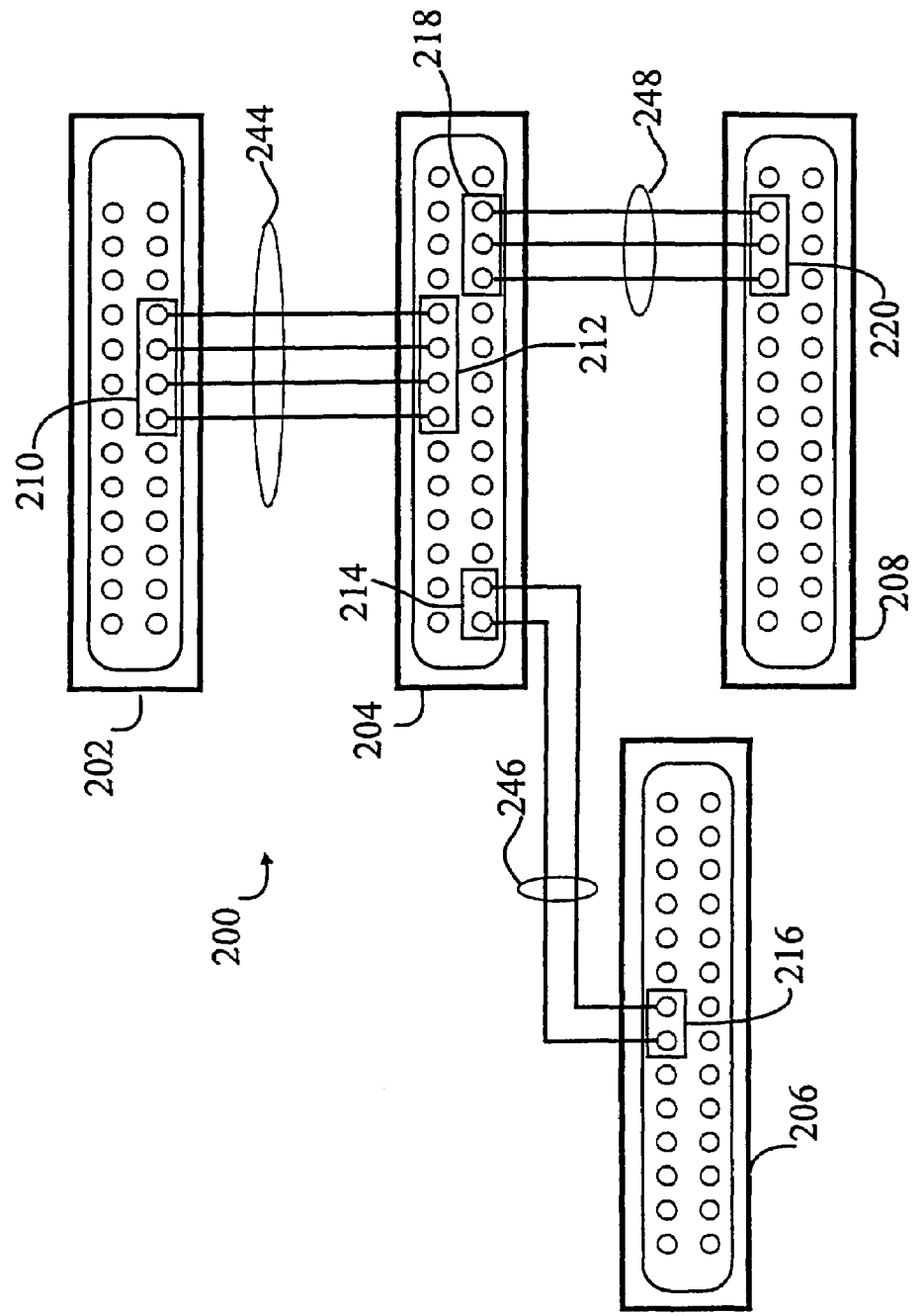
FIG. 2 is a perspective diagram that shows a network switch participating in multiple bonded ports.

FIG. 2 is a perspective diagram of a network system 200 with a network switch 204 participating in multiple bonded port sets. The network system 200 has four network switches 202, 204, 206 and 208, where the switches 202, 206 and 208 each have one bonded port set 210, 216, and 220, respectively, and where the switch 204 has three corresponding bonded port sets, 212, 214 and 218. The switches 202, 204, 206, and 208 include the controllers and port bonding components (not shown) as previously discussed with reference to FIG. 1. The bonded port sets 212, 214, and 218 of the switch 204 are connected to the bonded port sets 210, 216, and 220, respectively. The bonded port sets 212, 214, and 218 have four, two and three bonded ports, respectively. Each bonded port of each bonded port set of each switch is linked to a corresponding port of a corresponding bonded port set of another switch. In particular, four separate links of a bonded link 244 couple together the four bonded ports of the bonded port sets 210, 212. Likewise, two separate links of a bonded link 246 couple together the two bonded ports of the bonded port sets 214, 216 and three separate links of a bonded link 248 couple together the three bonded ports of the bonded port sets 218, 220.

Figure 3:
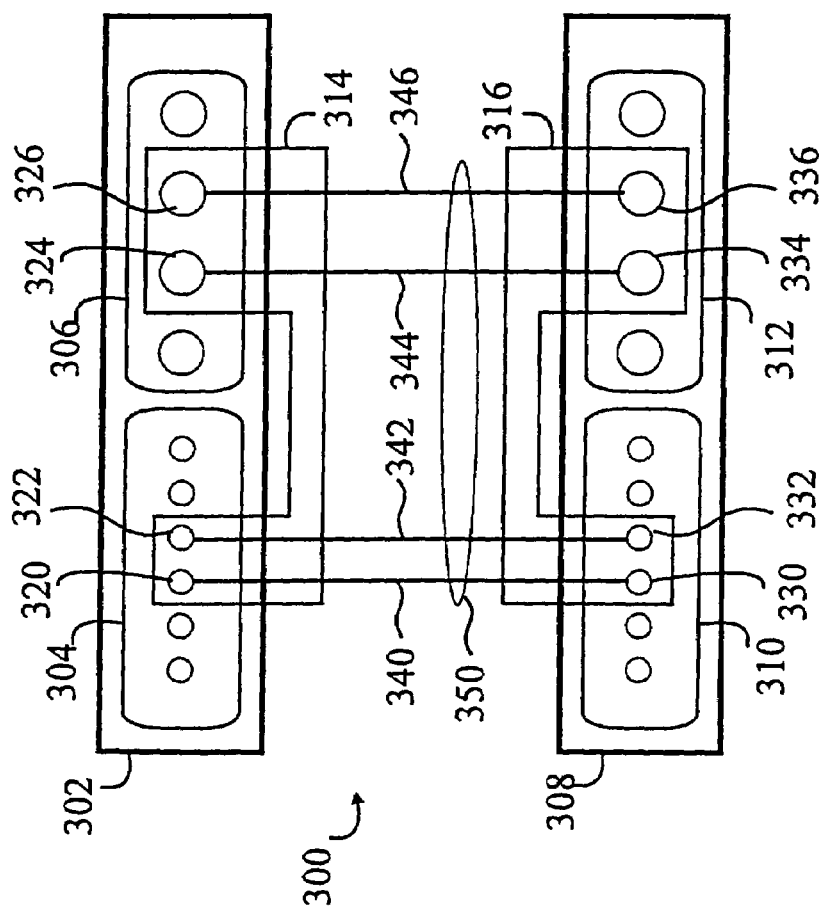
FIG. 3 is a diagram showing a bonded port set between two network switches where the bonded port set includes ports of different bandwidths.

FIG. 3 is a diagram of a network system 300 illustrating that bonded port sets can include ports of different bandwidths. Network switches 302, 308 include one or more ports 304 and 310, respectively, that operate at one speed and one or more ports 306 and 312, respectively, that operate at a different and greater speed. A bonded port set 314 on the switch 302 includes ports 320 and 322 from the ports 304 and ports 324 and 326 from the ports 306. Similarly, the bonded port set 316 on the switch 308 includes ports 330 and 332 from the ports 310 and ports 334 and 336 from the ports 312. A bonded link 350 established between the bonded port sets 314 and 316 includes links 340, 342, 344, and 346 for coupling together ports 320 and 330, 322 and 332, 324 and 334, and 326 and 336, respectively. The links 340 and 342 are of lower bandwidth than the links 344, and 346.

The distribution of packets over the bonded link 350 is preferably maintained in proportion to the bandwidth capacities of the included ports. For example, if the ports 306, 312 operate at ten times the speed of ports 304, 310, then approximately ten times the number of packets are sent across the links 344, 346 than the links 340, 342. In general, the ratio of the packet traffic through each of the ports of a bonded port set corresponds to the ratio of the bandwidths of the different ports of the bonded port set. Such traffic distribution provides maximizing the throughput of a network switch without causing the overload of any individual link.

Figure 4A:
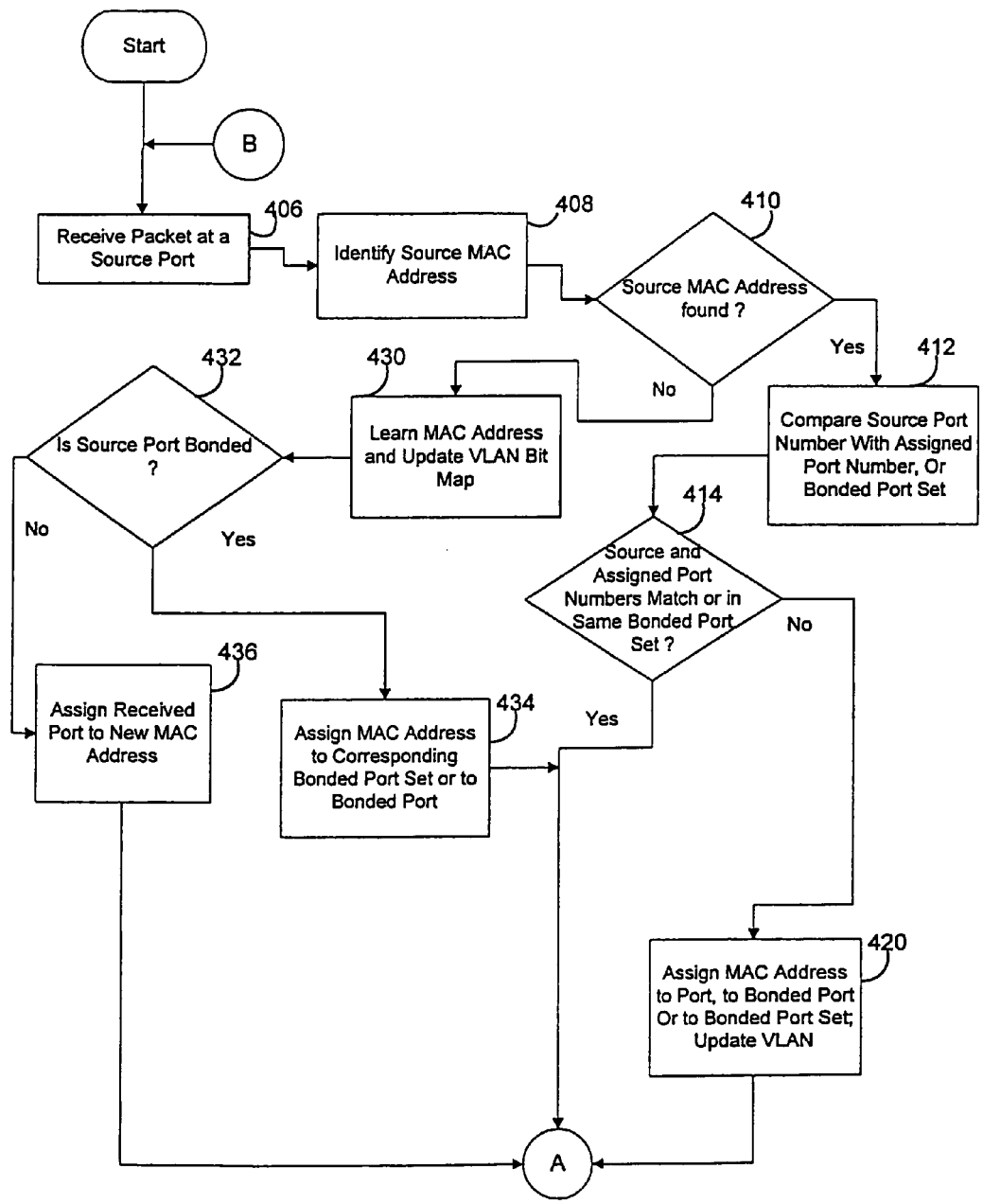
FIGS. 4A-4B are flowchart diagrams illustrating exemplary packet transmission operations of the network switches of FIG. 1.
Figure 4B:
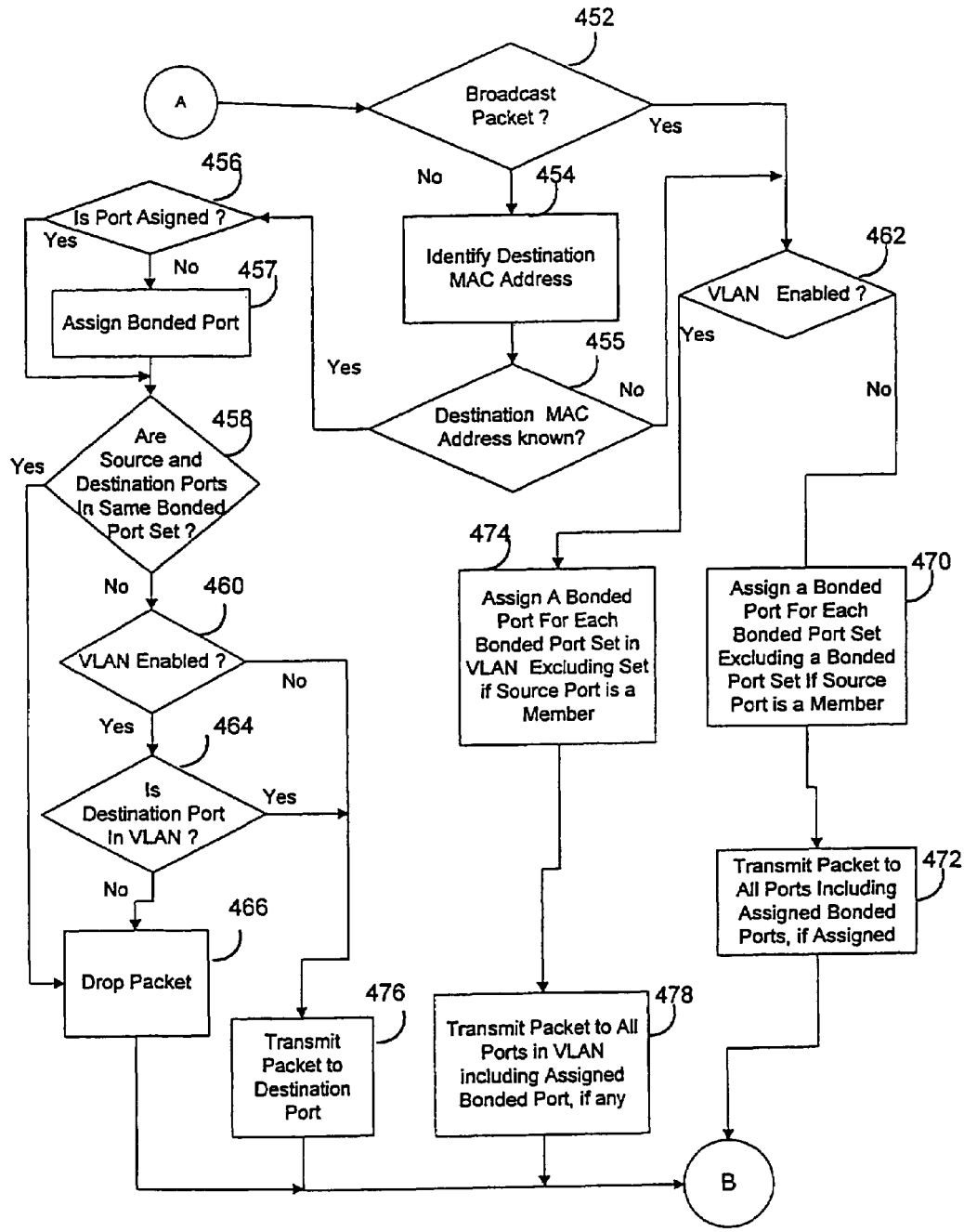

FIGS. 4A-4B are flowchart diagrams illustrating exemplary packet transmission operations of the network switches 102, 106 of FIG. 1. As described above, the switch 102 assigns bonded port sets in general to MAC addresses whereas the switch 106 assigns particular bonded ports to each MAC address. The flowchart handles both cases. If VLAN capabilities are implemented and enabled, then each switch 102, 106 sends packets only to those ports in the same VLAN associated with the source MAC address. If VLAN capabilities are not enabled, then packets are forwarded to all the other ports in the switch. If bonded ports are employed, then such broadcast packets are forwarded to only one port among the ports of the bonded port set, in addition to all the other (non-originating) ports in the switch.

FIG. 4A describes the normal operation of receiving packets and determining if the source MAC address is known, and subsequently transmitting the packet. At first step 406, the switch receives a packet and at next step 408 the switch retrieves the source MAC address from the packet. At next decision step 410, the switch determines if the source MAC address is known. The port control circuitry 150, 154 preferably includes memory (not shown) for storing MAC address and assigned port numbers or identifiers of bonded port sets. If the source MAC address is known, operation proceeds to next step 412 where the switch compares the assigned port or bonded port set to the source port at which the packet was received. Operation proceeds to decision step 414, where it is queried whether the source port is the same as the assigned port or if the source port is in the same bonded port set as the assigned bonded port set.

If the source and assigned port numbers match or if the source port is a member of the assigned bonded port set as determined at step 414, then operation proceeds to step 452, described below. If the source and assigned port numbers do not match or if the source port is not a member of the assigned bonded port set, then the switch determines that the network device associated with the source MAC address has moved to a different port. If so, operation proceeds to next step 420, where the switch assigns the source port to the MAC address if the source port is not bonded. If the source port is bonded, then the switch assigns the MAC address to either a particular bonded port or the bonded port set in general. Note that if the MAC address assigned to a specific bonded port, that it does not have to be the source port but may be any other bonded port in the same bonded port set as the source port. Such MAC by MAC address assignment is used in an attempt to provide even traffic flow among the bonded ports. Also, VLAN information is updated if included. Operation then proceeds to next step 452.

Referring back to decision step 410, if it is determined that the source MAC address is new, then the switch learns the new MAC address at next step 430 and updates the VLAN information if necessary. Generally, a new entry is made in memory for the new MAC address. Operation proceeds to next decision step 432, where the switch determines if the source port is bonded. If the source port is bonded as determined at step 430, the switch proceeds to next step 434 to assign the MAC address to either a bonded port or to the bonded port set of the source port. Again, if assigned to a particular bonded port, the assignment need not be the source port but may be another bonded port in the same bonded port set of the source port. Operation then proceeds to step 452. Referring back to step 432, if it is determined that the received port is not a bonded port, then the source port is assigned to the new MAC address at next step 436, and operation proceeds to step 452.

At step 452, the switch determines if the received packet has a unicast or broadcast destination MAC address. If unicast, operation proceeds to next step 454 to identify the destination MAC address from the packet. At next step 455 the switch determines if the destination MAC address is known in a similar manner as described above for the source port. If the destination MAC address of the packet is known, then operation proceeds to next step 456 to determine whether the MAC address is assigned to a particular port or to a bonded port set. If assigned to a bonded port set rather than a particular port, then operation proceeds to next step 457 where the switch assigns a bonded port for sending the packet. If the destination address was previously assigned to a particular port as determined in step 456 or after a bonded port is assigned in step 457, operation proceeds to step 458, where the switch determines if the source and destination ports are both bonded in the same bonded port set. If the source and destination ports belong to the same bonded port set, then operation proceeds to step 466, where the packet is dropped and operation returns to step 406 for the next packet.

Referring back to step 458, if the switch determines that the destination and source ports are not members of the same bonded port set, then the switch determines whether the VLAN capabilities are enabled at next step 460. If VLAN capabilities are not enabled, then operation proceeds to step 476 where the switch transmits the packet to the destination port, and operation returns to step 406 for the next packet. If VLAN is enabled as determined at step 460, then operation proceeds to next decision step 464 where the switch determines if the destination port is a member of the same VLAN as the source port. If it is determined that the destination port is not part of the same VLAN as the source port, then operation proceeds to step 466 where the switch drops the packet. Otherwise, the switch proceeds to step 476 to transmit the packet to the destination port. As before, operation then returns to step 406.

Referring back to steps 452 and 455, if the packet is a broadcast packet or if the destination MAC address is not known, then operation proceeds to decision step 462 to determine if VLAN is enabled. If VLAN is enabled, then operation proceeds to next step 474 where the switch assigns a bonded port for each bonded port set in the VLAN excluding the bonded port set of the source port, if bonded. Operation then proceeds to next step 478, where the switch transmits the packet to all the ports in VLAN including any assigned bonded ports, and operation returns to step 406. In this manner, the switch avoids packet looping by sending the packet only out one bonded port for each bonded port set. Referring back to step 462, if it is determined that VLAN is not enabled, operation then proceeds to next step 470, where the switch assigns a bonded port for each of the bonded port sets in the network switch while excluding a bonded port set if the source port is member of that bonded port set. Operation then proceeds to next step 472, where the switch transmits the packet to all ports including the assigned bonded ports, and then operation returns to step 406 for the next packet.

Figure 5:
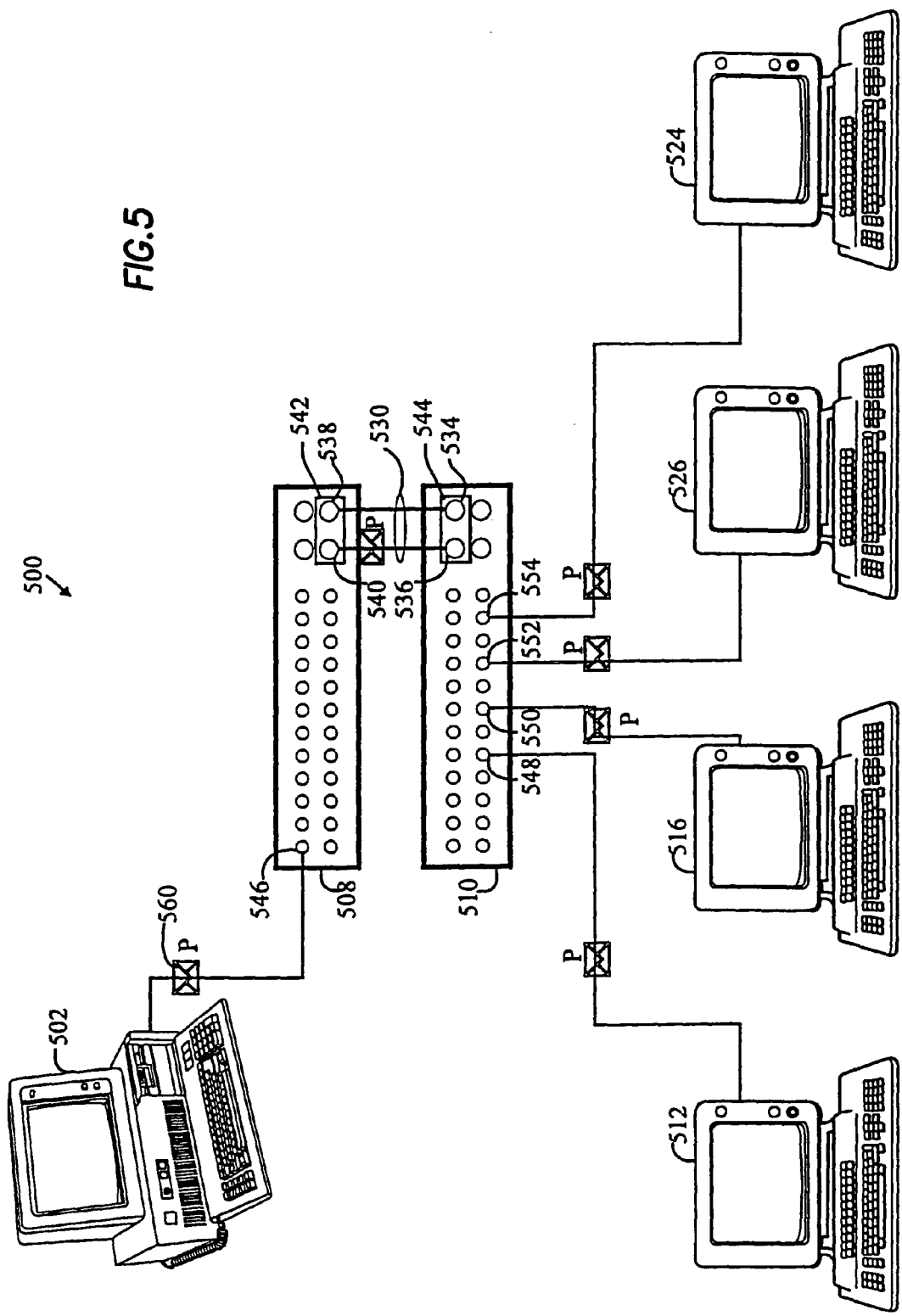
FIG. 5 is a diagram showing an exemplary broadcast packet being transmitted through a bonded set of ports between two network switches without any duplication of the packet.

Referring now to FIG. 5, a diagram is shown of network system 500 illustrating a packet being transmitted through a bonded set of ports between two network switches without any duplication of the packet. The network system 500 includes two network switches 508, 510. The two network switches 508, 510 implement port bonding while preventing data traffic received on a port in a bonded port set from being forwarded to any of the other ports in the same bonded port set. This applies to both unicast and broadcast traffic. A bonded port set 542 on the network switch 508 includes two bonded ports 538, and 540. On the network switch 510, a bonded port set 544 includes two ports 534, and 536. The bonded port sets 542 and 544 are linked together with bonded link 530.

A unicast packet 560 received by a network switch 508 from a network device 502, addressed to an unknown destination is broadcast by the network switch 508. However, the network switch 508 sends the unicast packet to all the ports that are not part of a bonded port set 542 (and that is not the originating port) and to only one of the ports in the bonded port set 542. The network switch 508 selects a specific bonded port, such as the port 540, for transmitting the unicast packet 560 to the network switch 510 over the bonded link 530.

The bonded port set 544 on the network switch 510 receives the packet on one of its bonded ports. The network switch 510 broadcasts the packet 560 to all its ports excluding the ports belonging to its bonded port set 544 if the destination address is unknown. The network devices 512, 516, 526 and 524, connected to the switch 510 via ports 548, 550, 552 and 554, respectively, receive the packet. If the packet 560 were a broadcast packet sent to the switch 508 from the network device 502, the processing of this broadcast packet by the switches 508 and 510 is similar to the processing of the unicast packet with an unknown destination described above.

Figure 6:
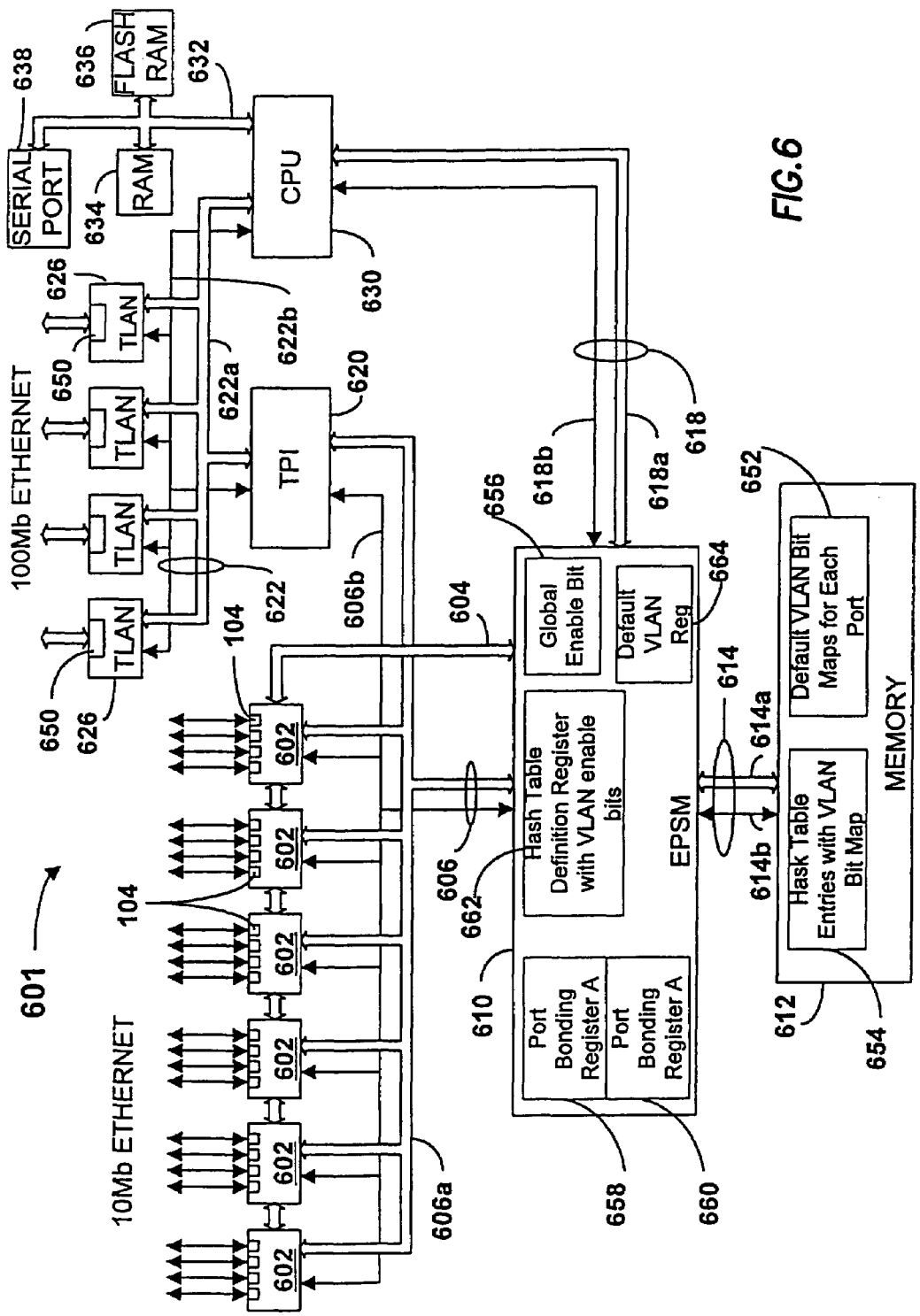
FIG. 6 is an exemplary block diagram of a network switch according to the present invention capable of supporting bonded ports.

Referring now to FIG. 6, a more detailed block diagram is shown of a network switch 600 implemented to support bonded ports according to the present invention. The network switch 600 could be used as either of the switches 102 or 106 or both in the network system 100 of FIG. 1, or as the network switches 202, 204, 206, 208, 302, 308, 508, 510 described previously. However, the network switch 600 assigns particular bonded ports to each MAC address rather then dynamically distributing traffic on a packet by packet basis as was describe for switch 102 above. The network switch 600 implements port bonding using a combination of hardware and software. The hardware includes a plurality of registers and memory for defining bonded ports and for assigning MAC addresses to particular bonded ports. Software operating on the network switch 600 includes a modified spanning tree, assignment of default VLAN bit maps and dynamic reassignment of MAC addresses to particular bonded ports.

In the embodiment shown, the network switch 600 includes six similar quad controller or quad cascade (QC) devices 602, each incorporating four ports 603. The QC devices 602 may be implemented in any desired manner, such as integrated into a single Application Specific Integrated Circuit (ASIC) package or as separate integrated circuit (IC) chips as shown. In the embodiment shown, each port 603 operates at 10 Mbps at half duplex, for a total throughput of 20 Mbps per port at full duplex. Each of the QC devices 602 preferably includes a processor interface coupled to a QC/CPU bus 604, and a bus interface coupled to a high speed bus (HSB) 606. The HSB 606 includes a data portion 606a and various control and status signals 606b.

The HSB 606 and the QC/CPU bus 604 are further coupled to an Ethernet Packet Switch Manager (EPSM) 610, which is implemented as an ASIC in the embodiment shown, although the present invention is not limited to any particular physical or logical implementation. The EPSM 610 is further coupled to a memory 612 through a memory bus 614, which includes a data and address portion 614a and control signals 614b.

The HSB 606 is coupled to a Thunder LAN (TLAN) port interface (TPI) 620, which is further coupled to a peripheral component interconnect (PCI) bus 622 including data and address signals 622a and related control and status signals 622b. The PCI bus 622 is coupled to four TLANs 626, which may be implemented in any desired manner. The TLANs 626 are preferably the TNETE100 ThunderLAN™ PCI Ethernet™ controllers manufactured by Texas Instruments, Inc. (TI), where each incorporates a port 650. To the EPSM 610, the TPI 620 operates in a similar manner on the HSB 606 as another QC device 602 for interfacing four ports. Thus, the EPSM 610 effectively "sees" seven (7) quad port devices. With respect to the PCI bus 622, the TPI 620 emulates a standard PCI bus to the degree necessary for proper operation of the TLANs 626, which normally interface with PCI memory devices. The PCI bus 622 is coupled to a processor or central processing unit (CPU) 630, which is coupled to a local processor bus 632 for coupling the CPU 630 to local RAM 634, a local flash RAM 636, and if desired, a serial port interface 638. The serial port interface 638 is preferably a UART or the like. In the embodiment shown, the CPU is a 32-bit, 33 MHz i960RP CPU by Intel, although the CPU 630 may be any other suitable processor.

The CPU 630 generally handles initialization and configuration of the TPI 620 and the EPSM 610 upon power up of the network switch 600. The CPU 630 also monitors and gathers statistics and also manages and controls the functions of the various devices of the network switch 600 during operation. The CPU 630 further updates hash table data in the memory 612 through the EPSM 610. The EPSM 610, however, controls access to the memory 612 and performs the DRAM refresh cycles thereby removing refresh operations from the CPU 630. The CPU 630 also acts as an additional network port for various purposes, and is often referred herein as PORT28. Thus, the ports 603, 650 and the CPU 630 collectively incorporate ports PORT0-PORT28, respectively. The CPU 630 is further coupled to the EPSM 610 through a CPU bus 618, which includes an address and data portion 618a and related control and status signals 618b. The address and data portion 618a is preferably multiplexed between address and data signals.

The hardware of the network switch 600, according to this exemplary embodiment according to the present invention, supports port bonding via several hardware features, including: a pair of port bonding registers 658, 660 provided in the EPSM 610; a VLAN bit map included in hash table entries of a hash table 654 provided within the memory 612; a plurality of default VLAN bit maps 652 in the memory 612 including a default VLAN bit map for each port PORT0-PORT27; and several VLAN enable bits in a Hash Table Definition Register 662 located in the EPSM 610. A global enable bit 656 is also included, where the VLAN definition for each of the ports PORT0-PORT27 is according to a default VLAN bit map defined in a VLAN register 664 if the global enable bit 656 is set. If the global enable bit 656 is set, then the default VLAN bit maps 652 and the particular VLAN bit maps in the hash table 654 are not used or otherwise ignored.

The port bonding registers 658, 660 are generally in the form of bit maps to identify the ports that are members of a different port bonding set. In particular, each register 658, 660 includes at least 28 bits (0-27), each bit representing one of the ports 602, 650 or the ports PORT0-PORT27. For example, setting bits 24 and 25 with the remaining bits cleared defines the ports PORT24 and PORT25 as belonging to a bonded port set. The register 658 identifies a first bonded port set and the register 660 identifies a second bonded port set. Although the switch 600 includes only two port bonding registers 658, 660 for supporting up to two bonded port sets, it is understood that more port bonding registers may be included to define more than two bonded port sets if desired. The CPU 630 executes software which defines VLAN bit maps during operation and preferably keeps a copy of the VLAN bit map assignments in the memory 634, among other information. It is noted that the implementation of the VLANs is optional to the implementation of the port bonding scheme. As such, the network switch 600 is also used to support port bonding in networks where VLANs are not implemented.

The network switch 600 uses the VLAN bit map in each hash entry in the hash table 654 as part of the port bonding implementation. When VLANs are not implemented, the VLAN bit map in each hash entry is usually set to all ones to indicate that broadcast packets are sent to all ports in the system and all ports may communicate via unicast packets. When VLANs are implemented, the VLAN bit map in each entry in the hash table 654 is used by the network switch 600 to identify which ports broadcast/multicast/unknown-broadcast packets are to be sent when being forwarded, and to identify which ports may communicate using unicast packets. The use of the VLAN bit map fields are based on the setting of the VLAN Enable bits in the Hash Table Definition Register 662. In the network switch 600, VLANs and port bonding may be used concurrently, and the VLAN bit maps are preferably used for port bonding even if VLANs are not needed or defined. Regardless of whether VLANs are used or not, when bonded ports are defined and used, the VLAN bit maps in the hash table entries are used to ensure that packet forwarding loops do not occur among ports in the same bonded port set. For bonded ports, the network switch 600 sets only one of the bits representing a port in a bonded port set in the VLAN bit map in each entry in the hash table.

To aid in broadcast mapping to evenly distribute broadcast traffic among the ports in a bonded port set, the CPU 630 via software sets different port bits in each VLAN bit map field for all hash entries where the bonded port set is included in the VLAN bit map. In this way, when broadcast traffic is sent to the bonded port set, it gets randomly distributed based upon the source address among the ports in the bonded port set to help evenly distribute the traffic load. Doing this will help the switch achieve as close to full bandwidth potential as possible on the bonded port set. The default VLAN bit maps are a series of bit maps for each port and are used in a similar manner as the hash entry VLAN bit maps except they are used when a packet with an unknown source MAC address is received on a port. The set bits representing bonded ports are distributed in a similar manner, but are distributed among all the ports or among all the ports in the VLAN.

Figure 7A:
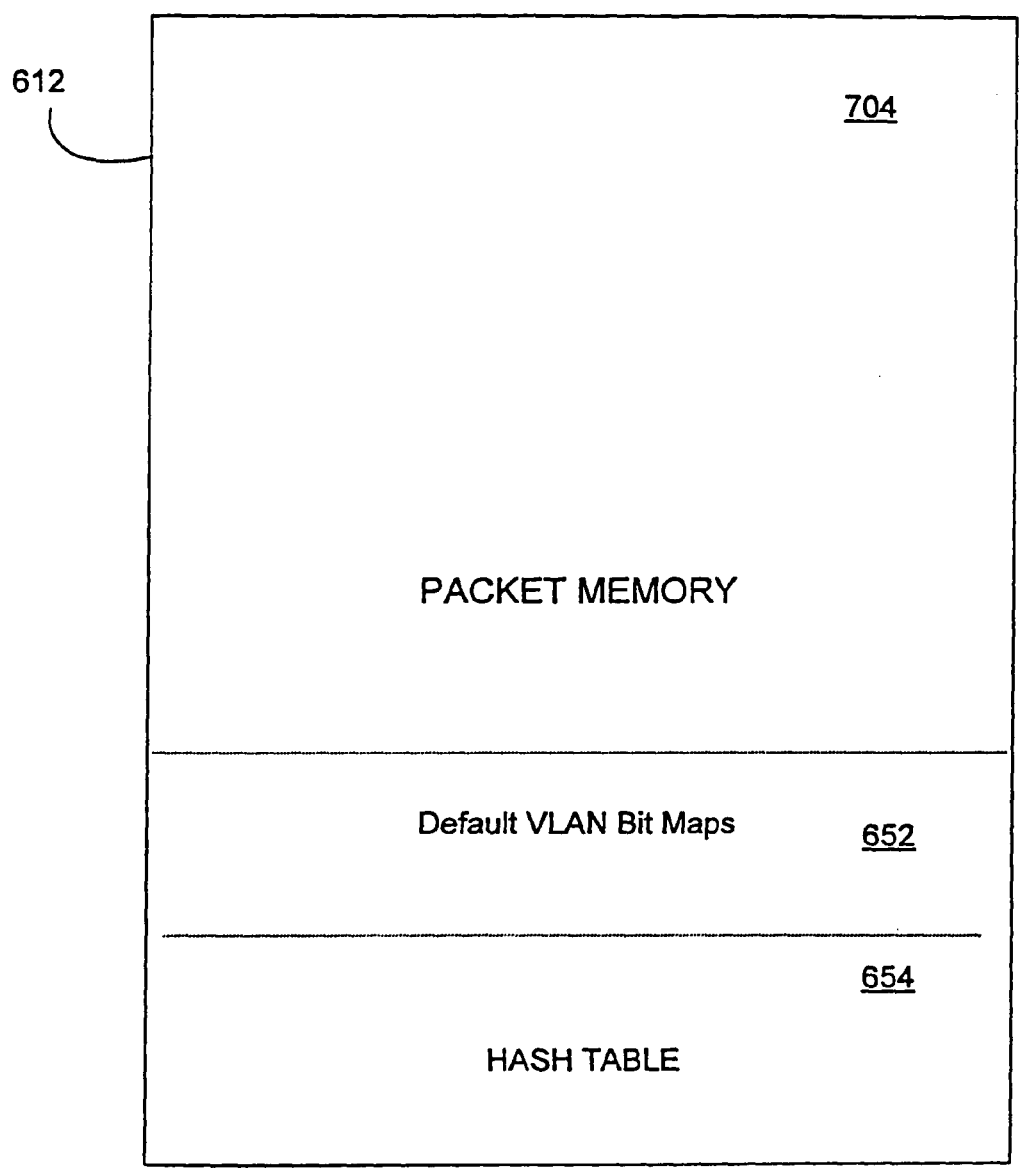
FIGS. 7A-7C are block diagrams illustrating the organization of the memory of FIG. 6.

FIG. 7A is a block diagram illustrating the organization of the memory 612 of FIG. 6. The memory 612 is used for several purposes including the storage of the hash table 654, the storage of packets of traffic data and storage of the per port default VLAN bit maps 652 for the ports of the network switch 600. The memory 612 is preferably divided into three main sections including the hash table 654, the default VLAN bit maps 652 and a packet memory section 704. The hash table 654 serves as a network device identification section for identifying one or more network devices coupled directly or indirectly to the network switch 600 via the ports PORT0-PORT27. The size of the hash table 654 may be programmable based on the number of devices and associated addresses and entries desired. The hash table 654 may be located anywhere in the memory 612, but is preferably located at the beginning of the memory 612 in the embodiment shown. The default VLAN bit maps 652 are preferably stored adjacent or near the hash table 654. The size of the packet memory section 704 is preferably the balance of the remaining memory 612 not used by the hash memory section 654 and the default VLAN bit maps section 652.

Figures 7B, 7C:
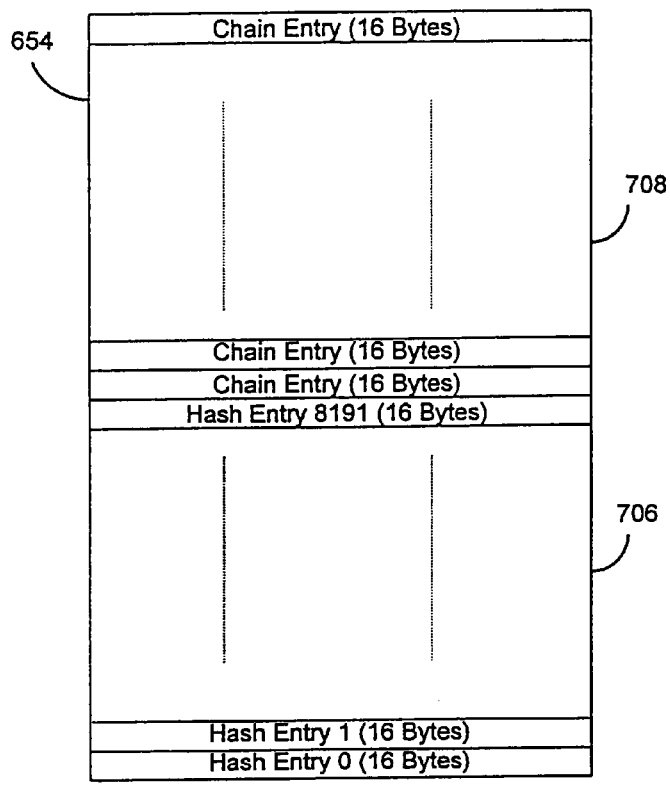

FIG. 7B is a block diagram of the organization of the hash table 654 of the memory 612. The hash table 654 is divided into two sections including a first primary hash entry section 706 for primary hash entries and a second chained hash entry section 708 for chained hash entries. In the embodiment shown, each of the sections 706, 708 includes up to 8K entries, each 16 bytes in length.

FIG. 7C is a diagram illustrating the organization of a hash table entry 710 representative of each of the entries in the hash table 654, including both the primary hash entry section 706 and the chained hash entry section 708. Each entry 710 corresponds to one MAC address of network devices coupled to the network switch 600. Each of the primary entries are located at a hash key, which is determined by "hashing" the MAC address for that device. In particular, each network device is assigned a 48-bit MAC hardware address, which is a unique numerical value assigned to each network device during the manufacturing process or by setting jumpers or switches during network installation. One part of this MAC address is assigned to the manufacturer by the IEEE (Institute of Electrical and Electronics Engineers) and is common to all components from that manufacturer; the second part of the hardware address is a unique value assigned by the hardware manufacturer.

The first 6 bytes, or bytes 5-0, of the hash table entry 710 contains the MAC address of the device associated with that entry. The network switch 600, therefore, adds a hash table entry for each network device that sends a data packet including its source MAC address.

The next byte (6) of the hash table entry 710 contains a binary port number (PortNum) identifying the associated port number to which the device is connected, where the port number for PORT0 is zero, the port number for PORT1 is one, the port number for PORT28 (for the CPU 630) is 28, etc. The next byte (7) is a control and age information byte (Control/Age) including a valid bit (VALIDENTRY) identifying whether the entry is valid or not, where a logic "1" indicates the entry is valid and logic "0" indicates that the entry is not valid, otherwise called an empty entry. The Control/Age byte includes a binary age number (AGE) representing the elapsed time from the last source access associated with this device.

The next four bytes (11:8) define a 29-bit virtual-LAN (VLAN) bit map value representing port groupings, if used. Each bit of the VLAN value corresponds to a respective one of the ports and is set if the device or port is grouped with that port. VLAN bit maps enable the ports PORT0-PORT28 of the network switch 600 to be grouped in any desired combination to form a plurality of different LANs. For example, if the first five ports port PORT0-PORT4 are grouped together, then the VLAN value for each hash entry to be included in the group is 0000001Fh, where "h" denotes a hexadecimal value. A VLAN value of all ones or 1FFFFFFFh denotes no VLAN groupings for that device. It is noted that it is possible for one device to be associated with more than one group. For each VLAN bit map, the bit representing the port itself (as source port) may or may not be set depending upon the embodiment. The network switch 600 includes logic to ensure that a packet received by a port is not sent back out that port, so that its VLAN bit in its VLAN bit map may be set if desired. Alternatively, if a network switch relies on the VLAN bit maps for forwarding packets, it is desired that the VLAN bit representing the source port not be set.

The last four bytes (15:12) of each hash table entry 710 is a link address (Link A[31:0] or Link Address) pointing to the next entry having an identical hash key, if any, in the chained hash entry section 708. MAC addresses are hashed according to one of several algorithms. For example, two portions, such as 13-16 bits, of each MAC address are logically combined or compared to calculate a corresponding hash key. Each portion is combined using exclusive-OR (XOR) logic in a bit-wise fashion to form a 13-16 bit hash key. It is understood that many other different hashing algorithms are known and may be used to combine any particular combinations of the address bits as known to those skilled in the art, and that the present invention is not limited to any particular hashing scheme. The hash key is used as the actual address or as an offset address to locate a corresponding hash entry of the primary hash entry section 706. Although the MAC addresses are unique, the hash key may not be unique such that two different MAC addresses hash to the same hash key.

The chained hash entry section 708 is provided to store MAC addresses with duplicate hash keys for different devices. The next entry is stored in the next available location in the chained hash entry section 708. In this manner, if two MAC addresses of two different devices hash to the same hash key, the first or "primary" entry is stored in the primary hash entry section 706, and the second entry is stored in the chained hash entry section 708, and the Link Address of the primary entry points to the second entry. If another MAC address hashes to the same hash key as the first two, then each additional entry is stored in the chained hash entry section 708 and linked together in consecutive order using the Link Addresses. Thus, the first points to the second, the second points to the third, and so on. Each entry follows the format of the hash table entry 710. The format of the Link address may be defined in any convenient manner. The Link address typically includes a base address portion pointing to the hash memory section 702 within the memory 612, and an offset portion to the actual entry within the hash memory section 702. The lower address bits may be set to zero for byte alignment as desired.

In the preferred embodiment, the last entry in each chain has its link address set to point to the beginning of the default VLAN bit maps 652. In this manner, if the link address equals the beginning address of the default VLAN bit maps 652, then a hash miss on the source MAC address has occurred. In that case, the VLAN bit map in the default VLAN bit maps 652 corresponding to the source port is used as the VLAN bit map for the current packet to determine what ports to send the packet to. Since the MAC address causes the CPU to enter the new MAC address into the hash table 654, subsequent packets with the same source MAC address use the VLAN in the hash table 654.

In general, the bit corresponding to the port number of a bonded port is set for the default VLAN bit maps of each bonded port and the VLAN bit maps of MAC entries assigned to that bonded port, if any. The bits for the other bonded ports in the same bonded port set are cleared. For each default VLAN bit map of bonded ports, the bits corresponding to other ports in the same VLAN are also set if the VLAN includes the same bonded port set. The VLAN bit maps for entries in the hash table 654 corresponding to MAC addresses received at bonded ports also have the bits set corresponding to other ports in a VLAN if that VLAN includes the corresponding bonded port set.

It is noted that VLANs may overlap, and that two or more VLANs may include the same bonded port set. When a bonded port set is included in multiple VLANs, the default VLAN bit maps for the bonded ports of the bonded port set includes all the ports of all the VLANs in which the bonded port set participates. Since the VLAN bit maps for the ports of the bonded port set includes all the ports from all the VLANs in which a bonded port participates (with modifications for the bits of the bonded port set), broadcast traffic received over a bonded port is sent to all those VLANs.

Figure 8:
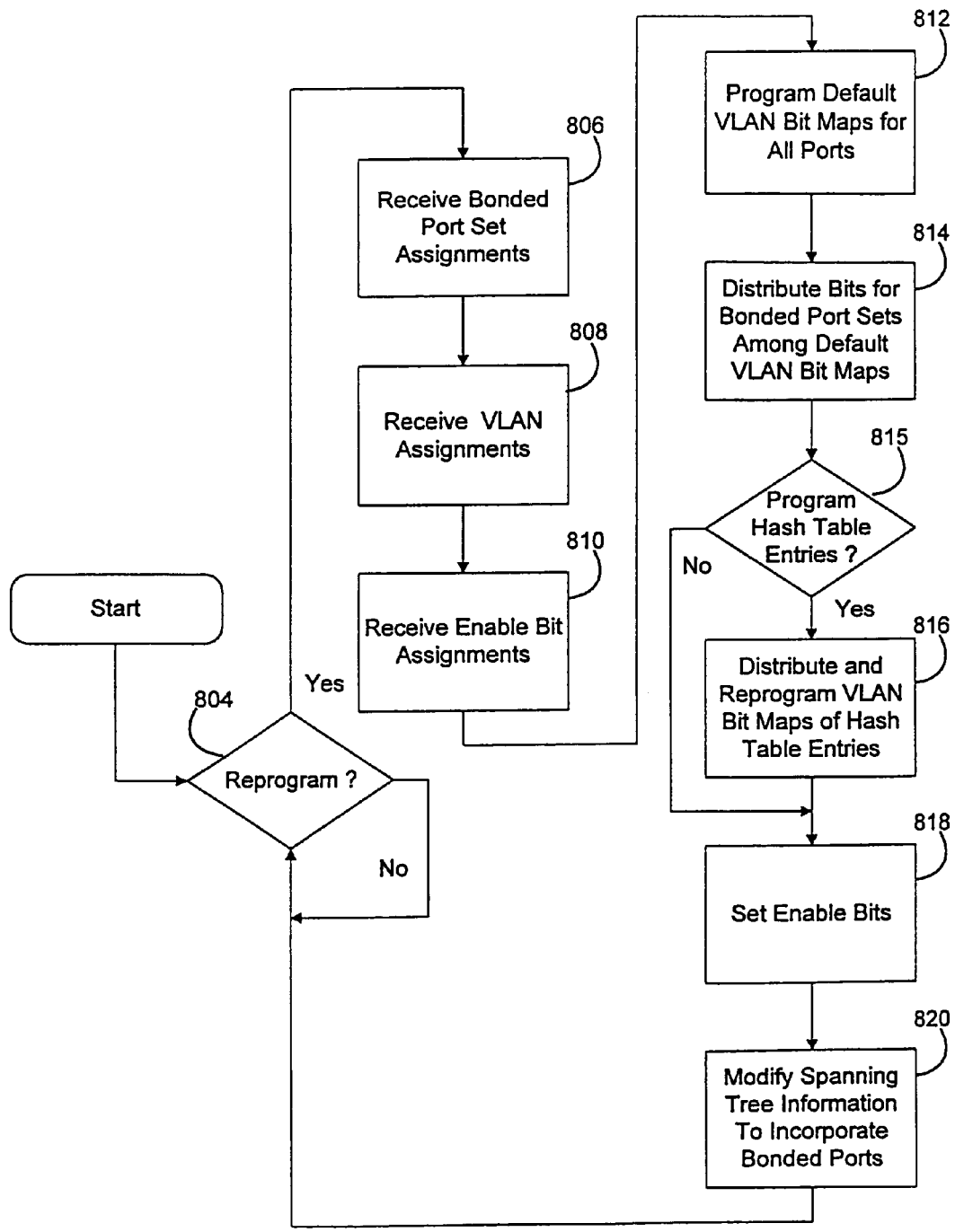
FIG. 8 is a flowchart diagram illustrating an exemplary initialization and programming operation of the network switch of FIG. 6.

FIG. 8 is a flowchart diagram illustrating an exemplary initialization and reprogramming operation of the network switch 600 of FIG. 6. The network switch 600, in the present invention, is initialized with default settings for the various parameters such as the VLAN membership and port bonding information. The network switch 600 optionally monitors the traffic through the ports, particularly the traffic on bonded ports, and dynamically reassigns VLAN bits to balance traffic if desired.

With reference to FIG. 8, the network switch 600 of FIG. 6 detects an input from a user to indicate setting initialization values or for reprogramming those values at first decision step 804. It is noted that an initialization or driver routine may be executed by the CPU 630 upon power up or reset of the network switch 600, where the routine is stored in non-volatile memory, such as the Flash RAM 636. Also, a driver routine may be loaded in the memory 634. A user programs the network switch 600 via the software port 638, or by executing a management program externally and accessing the CPU 630 via any one of the ports PORT0-PORT27. In this manner, the network switch 600 may be programmed initially with bonded port and VLAN assignments and may be programmed at any time during operation.

If, at the step 804, the network administrator or manager indicates the desire to initialize or reprogram the network switch 600, operation proceeds to next step 806 to receive bonded port set assignments and then to step 808 to receive VLAN assignments. The CPU 630 receives the bonded port set assignments and programs the port bonding registers 658, 660 accordingly. The CPU 630 then receives the enable bit assignments in next step 810 including VLAN enable bits and the global enable bit 656. The enable bits include a VLAN Group Broadcast Enable Bit, a VLAN Miss Broadcast Enable Bit, and a VLAN Unicast Enable Bit. When set to one, the VLAN Group Broadcast Enable Bit causes the network switch 600 to not forward broadcast and multicast packets to ports whose bits are set to zero in the VLAN bit map field of the hash table entry of the packet's source MAC address. If the source MAC address is not in the hash table 654, the default VLAN bit map for the source port is used. When set to one, the VLAN Miss Broadcast Enable Bit causes the network switch 600 to not broadcast packets, due to destination address hash misses, to ports whose bits are set to zero in the VLAN bit map field of the hash table entry of the packet's source MAC address. If the source MAC address is not in the hash table 654, the default VLAN bit map for the source port is used. When set to one, the VLAN Unicast Enable Bit causes the network switch 600 to not forward unicast packets to ports whose bits are set to zero in the VLAN bit map field of the hash table entry of the packet's source MAC address. If the source MAC address is not in the hash table 654, the default VLAN bit map for the source port is used.

From step 810, operation proceeds to step 812, where the default VLAN bit maps 652 for all the ports are programmed according to the VLAN assignments received at step 808. If bonded port set assignments are received at step 806, however, then the bits corresponding to the bonded ports in each VLAN are assigned. This is shown at next step 814, where the network switch 600 distributes bits corresponding to bonded ports among the VLAN default bit maps for each VLAN. Only one of the bonded port bits in each default VLAN bitmap is set, so that bonded ports in each VLAN are distributed on a port by port basis in the per port default VLAN bit maps 652.

As an example, if a VLAN includes ports PORT0-PORT4 and PORT24 where PORT24 is bonded to ports PORT25 and PORT26, then the VLAN effectively includes the bonded port set including ports PORT24-PORT26. The default VLAN bit map for each of the ports PORT0-PORT4 includes all of the non-bonded ports PORT0-PORT4 plus one of the bonded ports. The VLAN bit map for a given port may or may not be defined to include that port. The VLAN bit maps described herein include its own port, it being understood that packets are generally not forwarded back to the receiving port. Separate logic in the network switch 600, for example, ensures that packets are not forwarded to the receiving port. However, if such logic were not provided, the VLAN bit maps for a given MAC address would not have its source port set. The default VLAN bit map for port PORT0 may include ports PORT0-PORT4 and PORT24 (or, alternatively, may exclude PORT0), the default VLAN bit map for port PORT1 may include ports PORT0-PORT4 and PORT25 (or, alternatively, may exclude PORT1, etc.), the default VLAN bit map for port PORT2 may include ports PORT0-PORT4 and PORT26, the default VLAN bit map for port PORT3 may include ports PORT0-PORT4 and PORT24 and the default VLAN bit map for port PORT4 may include ports PORT0-PORT4 and PORT25. In this manner, the three bonded ports PORT24-PORT26 are distributed among the five non-bonded ports PORT0-PORT4.

Operation proceeds to next decision step 815 to determine whether there are any entries in the hash table 654 and if so, whether those entries are to be reprogrammed. If the network switch 600 is reset or otherwise being initialized for operation, then there will be no hash table entries. However, if the network switch 600 is being programmed during operation after several MAC addresses have been learned and stored in the hash table 654, then there are at least two options corresponding to two different embodiments. In a first embodiment, the entries in the hash table 654 are ignored and the entire hash table 654 is initialized as if no MAC addresses have been received, and operation proceeds from step 815 to step 818, described below. The network switch 600 learns all the MAC addresses again in subsequent operation. This may be desirable since reprogramming may correspond to significant changes of the network system.

Alternatively, if hash entries exist in the hash table 654 and it is desired to keep them, operation proceeds from step 815 to step 816, where the network switch 600 distributes and reprograms VLAN bit maps of each of the entries in the hash table 654. In this case, however, the bonded ports are distributed in the VLAN bit maps in the hash table entries on a MAC address by MAC address basis. In the example above for a VLAN including ports PORT0-PORT4 and a bonded port set including ports PORT24-PORT26, assume that three devices with corresponding MAC addresses A, B and C are coupled to ports PORT2, PORT3 and PORT4, respectively, and that the hash table 654 includes entries for each. The VLAN bit map of the entry for MAC address A may include ports PORT0-PORT4 and PORT24, the VLAN bit map of the entry for MAC address B may include ports PORT0-PORT4 and PORT25, and the entry for MAC address C may include ports PORT0-PORT4 and PORT26. This is done in an attempt to achieve even distribution assuming the devices in the network system generate approximately the same amount of packets over time.

At a next step 818, the enable bits are set as per the user's preference that were previously specified at the block 810. Finally, step 820 is included to illustrate that the spanning tree information used to establish routes between network devices is modified to incorporate changes in the bonded port information. Operation returns to step 804 until reprogramming, reset or initialization occurs.

Figure 9A:
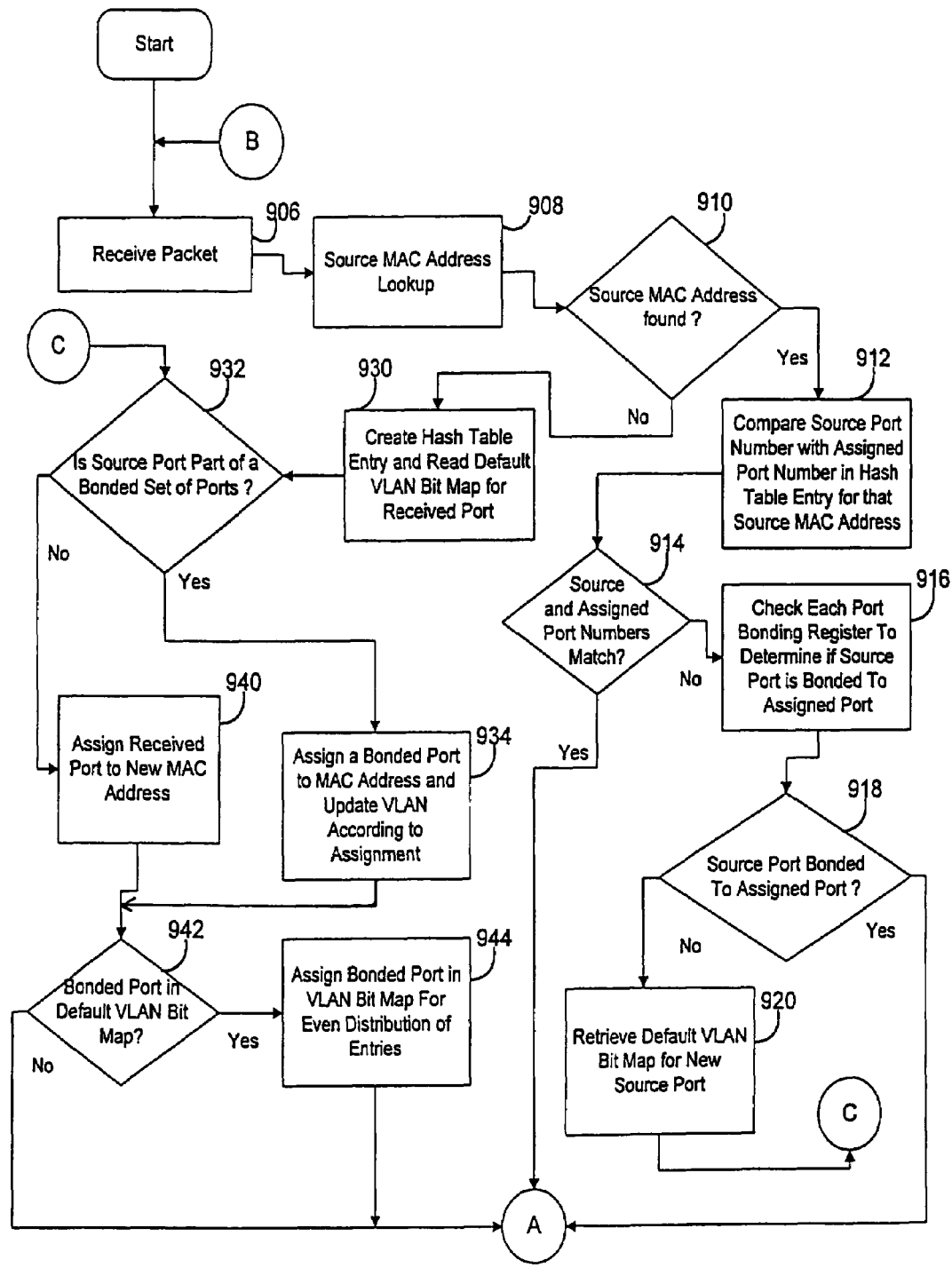
FIGS. 9A-9B are flowchart diagrams illustrating another pack transmission operations of the network switch of FIG. 6.
Figure 9B:
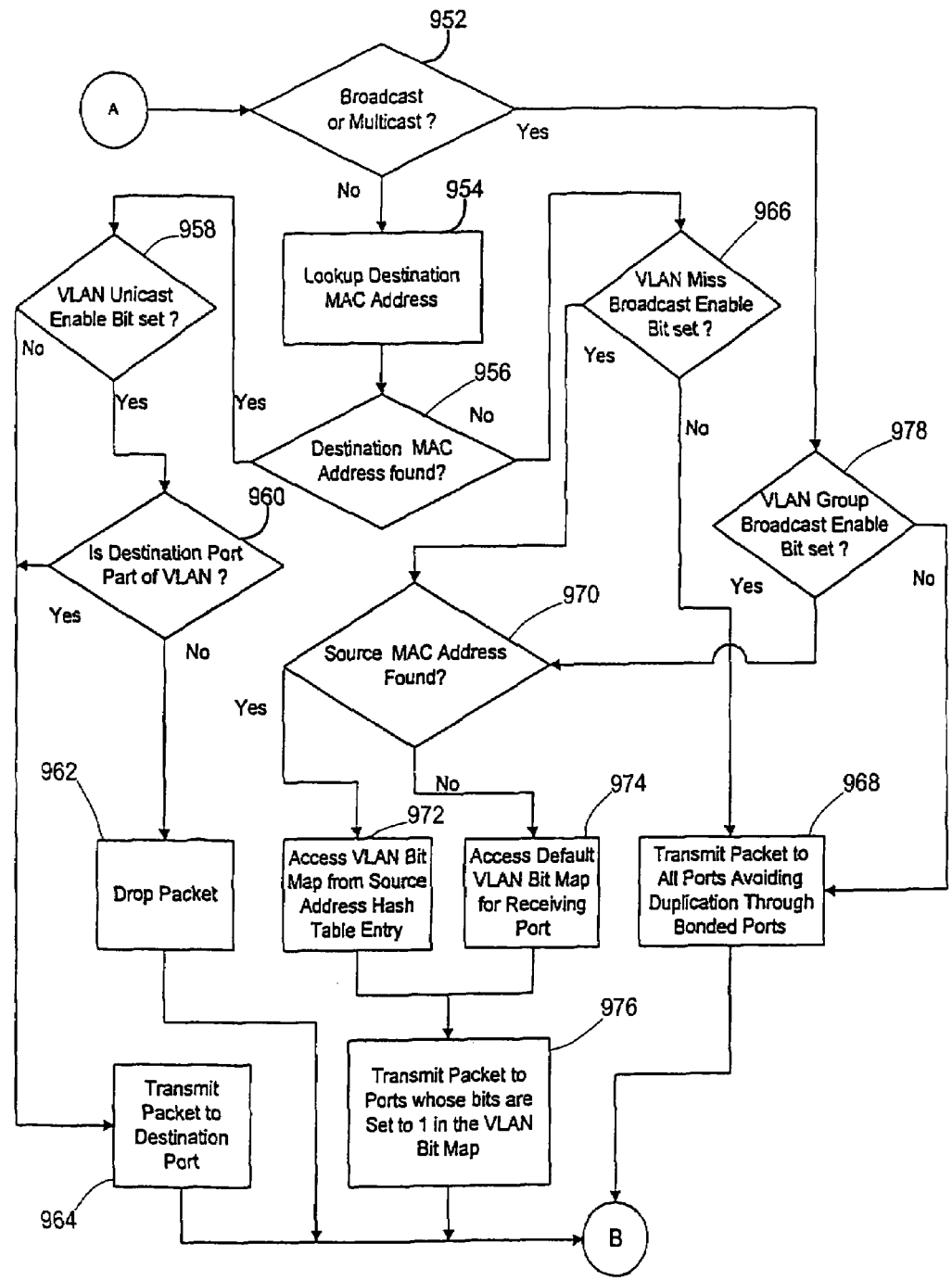

FIGS. 9A-9B are flowchart diagrams illustrating packet transmission operation of the network switch 600 of FIG. 6. FIG. 9A describes the normal operation of receiving packets and looking up the source MAC address in the hash table 654 and subsequently managing traffic flow through the bonded ports. FIG. 9B describes determination of packet type, destination address hashing and lookup and transmission of the packet. At first step 906, the network switch 600 receives a packet and at next step 908, the EPSM 610 hashes the source MAC address and performs a hash table lookup in the hash table 654. At next decision step 910, the EPSM 610 determines if the source MAC address was found in the hash table 654. If the source address was found, operation proceeds to step 912, where the EPSM 610 compares the assigned port number in the hash table 654 corresponding to the source MAC address with the port number of the actual source port. At next step 914, the EPSM 610 determines if the source and assigned port numbers match. If the source and assigned port numbers match, then operation proceeds to step 952, described below. The VLAN bit map in the entry in the hash table 654 is used for transmission, as described below.

If the source and assigned port numbers do not match as determined in step 914, operation proceeds to step 916 to compare the port bonding registers 658, 660 with the source and assigned port numbers. At next step 918, it is queried whether the source and assigned port numbers are bonded together in the same bonded port set. If so, then operation proceeds to step 952. Otherwise, if the source and assigned ports are not bonded together as determined in step 918, then operation proceeds to step 920 where the default VLAN for the new source port is retrieved. Alternatively, the default VLAN bit map is not retrieved and the VLAN bit map in the hash table 654 is used. In either case, although the MAC address is known, the device associated therewith has moved to another port and the contents of the VLAN bit map in the hash entry is no longer valid. From step 920, operation proceeds to step 932, described below.

Normally, if the source and assigned port numbers do not match, the EPSM 610 generates an interrupt to the CPU 630 to indicate that the device associated with the source MAC address has moved to a different port. The interrupt to the CPU 630 is known as a "Port Miss" interrupt. However, under the bonded port arrangement, packets from the same MAC address will typically get evenly received on the bonded ports within the same bonded port set and therefore, the "Port Miss" interrupt feature is effectively disabled for packets received on ports within the same bonded port set. This is a function of the port bonding registers 658, 660. Thus, if the source and assigned ports do not match, then the EPSM 610 checks each port bonding register 658, 660 at step 916 to determine if both bits that represent the source port and the previously assigned port in the hash entry for the source MAC address are set. If both bits are set in the same port bonding register, then the source and assigned ports are bonded and an interrupt to the CPU 630 is not generated.

Referring back to the decision step 910, if the source MAC address is new and is not located in the hash table 654, then operation proceeds to step 930 where an interrupt is generated to the CPU 630 to create a new hash entry in the hash table 654 for the new MAC address. As described previously, if a hash miss occurs, the Link address points the hardware to the beginning of the default VLAN bit maps 652. The default VLAN bit map is used to determine which ports are allowed if VLAN is enabled. From step 930 or 920, operation proceeds to decision step 932, where it is determined whether the source port is bonded. If the source port is bonded, operation proceeds to step 934 where the CPU 630 assigns one of the bonded ports of the bonded port set to the MAC address. The assigned bonded port is not necessarily the source port at which the packet was received, but instead the assignment is made to balance traffic on the bonded port set. Bonded port numbers are assigned to MAC addresses in a round-robin fashion, a random fashion or in any other fashion to distribute MAC addresses evenly (or to achieve proportional bandwidth) across the ports of the bonded port set. The VLAN bit map of the new or modified entry in the hash table 654 is programmed according to the bonded port assignment. In particular, the bits in the VLAN bit map corresponding to ports in the same VLAN or VLANs are set. From step 934, operation proceeds to step 942, where it is determined if any one or more bonded ports are in the default VLAN bit map of the source port, as further described below.

Referring back to step 932, if it is determined that the source port is not a bonded port, then the port number of the actual source port is assigned to the MAC address and the hash table entry is updated at step 940. Operation proceeds to next step 942, where it is determined if any one or more bonded ports are in the default VLAN bit map of the source port. If not, operation proceeds to step 952. If the default VLAN bit map includes one or more bonded port sets even though the source port is not bonded itself, operation proceeds to step 944, where the software assigns one of the bonded ports to the MAC address. This is achieved by setting the corresponding bit in the VLAN bit map of the entry in the hash table 654 in a similar manner as described previously to achieve even distribution of traffic. Subsequently, operation proceeds to the next step 952.

At step 952 in FIG. 9B, it is determined whether the received packet is a broadcast or multicast packet. If not, then the packet is unicast and operation proceeds to step 954 to lookup the destination MAC address in the hash table 654. At the next step 956, it is determined whether the destination MAC address is found in the hash table 654. If found, then at next step 958, the EPSM 610 determines if the VLAN Unicast Enable Bit is set. If not set, then the network switch 600 transmits the unicast packet to the destination port at next step 964 and operation returns back the step 906. If the VLAN Unicast Enable Bit is set as determined in step 958, then at next step 960, it is determined whether the destination port is part of the VLAN of the source port. If the source MAC address was found and the source port matched or was in the same bonded port set as the assigned port, then the VLAN bit map in the hash table 654 is used, but otherwise, the default VLAN bit map for the source port is used. If it is determined at step 960 that the destination port is not part of the VLAN of the source port, then operation proceeds to step 962, at which the network switch 600 drops the packet. From step 962, operation returns back to step 906 for the next packet. If the destination port is part of the VLAN of the source port, then operation proceeds to step 964, at which the network switch 600 transmits the unicast packet to the destination port, and operation returns to step 906.

Referring back to step 956, if the destination MAC address was not found in the hash table 654, then operation proceeds to decision step 966 to determine if the VLAN Miss Broadcast Enable bit is set. If not, then operation proceeds to step 968 where the network switch 600 transmits the packet from all of the non-bonded ports and one bonded port for each bonded port set defined by the port bonding registers 658, 660, and operation returns to step 906. The selected ports may be predefined or determined dynamically at the time step 968 is performed. In the preferred embodiment, the VLAN Miss Broadcast Enable bit is set if port bonding is enabled, so that the network switch 600 simply transmits that packet from all other ports regardless of the bits in the port bonding registers 658, 660 as port bonding is not enabled.

If the VLAN Miss Broadcast Enable bit is set as determined at step 966, then operation proceeds to decision step 970, where it is queried whether the source MAC address was found. If so, operation proceeds to step 972 to access the VLAN bit map from the source hash table entry. Otherwise, if the source MAC address was not found, operation proceeds to step 974 to access the default VLAN bit map for the receiving port. From either steps 972 or 974, operation proceeds to step 976, where the network switch 600 transmits the packet from those ports indicated in the retrieved VLAN bit map. This VLAN bit map is either the VLAN bit map in the hash table 654 or the default VLAN bit map if the MAC address was new or moved to a different port. From step 976, operation returns to step 906 for the next packet.

Referring back to the step 952, if the packet is determined to be a broadcast packet, then it is determined whether the VLAN Group Broadcast Enable bit is set at a next step 978. If the VLAN Group Broadcast Enable bit is not set, operation proceeds to step 968 described above and if set, operation proceeds to step 970 also described above. A broadcast or multicast packet is treated in a similar manner as a unicast packet with unknown destination port.

Figure 10:
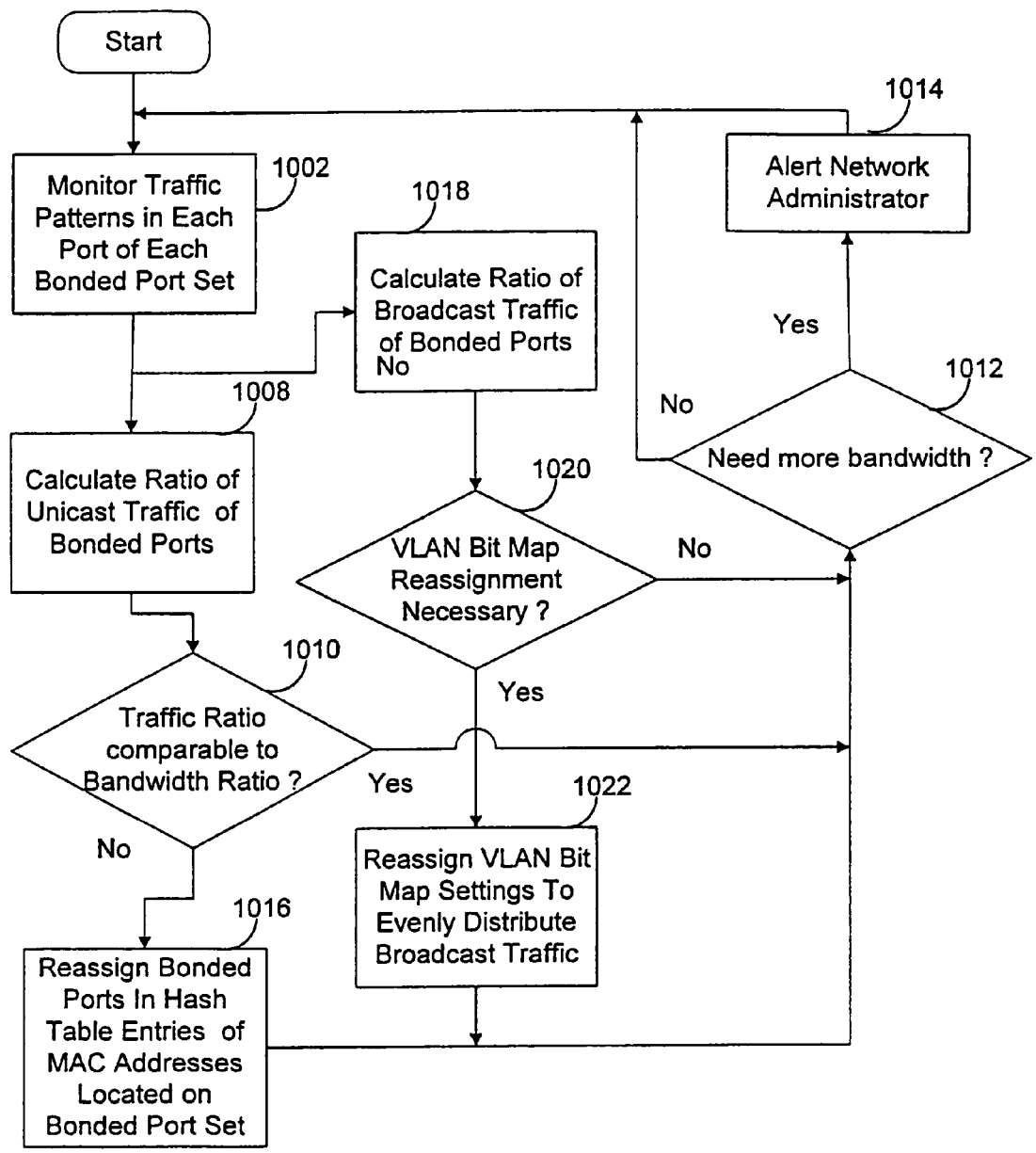
FIG. 10 is a block diagram illustrating exemplary optional dynamic traffic monitoring and load balancing features.

FIG. 10 is a block diagram illustrating exemplary optional dynamic traffic monitoring and load balancing features. As described above, the network switch 600 assigns a bonded port to each MAC address "residing on" a bonded port set or received by a bonded port in that bonded port set. Thus, unicast traffic designating a MAC address residing on a bonded port set as the destination is always sent to the assigned bonded port. Although the assignments are evenly distributed, they are randomly or arbitrarily made and some devices in operation may be significantly more active than others. For example, a MAC address residing on a bonded port set may correspond to a server, where most of the traffic from the network switch 600 is to that server. This may cause an imbalance of the traffic on the bonded port to which the server is assigned. In that case, it may be desired to move other MAC addresses from that bonded port to other bonded ports of the same bonded port set. Such reassignment should consider the relative bandwidth of the bonded ports. If bandwidth is equivalent, then traffic flow should be as equal as possible. If the bandwidth of two or more bonded ports are not equal, then the speed or bandwidth ratio of the bonded ports is considered.

In a similar manner, one or more devices coupled to non-bonded ports of the network switch 600 may, over time, generate a significantly greater amount of broadcast traffic than other devices coupled to other non-bonded ports of the network switch 600. Regardless of whether VLAN assignments are used or not, the bonded port assignments of several devices of a given bonded port set may, albeit evenly distributed on a MAC by MAC address basis, result in uneven broadcast traffic flow on the bonded ports of the bonded port set. The VLAN bit map settings are adjusted to redistribute broadcast traffic to achieve more even traffic flow. Again, the relative bandwidth of bonded ports should be considered when determining reassignments.

At step 1002, the CPU 630, operating in conjunction with the EPSM 610, continuously gathers statistical information of the ports PORT0-PORT27 to evaluate traffic patterns for both unicast and broadcast packets, especially through the bonded ports of each bonded port set. Such monitoring is made on a MAC address by MAC address basis to determine the amount of traffic associated with each MAC address. Such monitoring also distinguishes between unicast and broadcast traffic to determine the type of adjustments to be made.

From step 1002, operation proceeds to two different steps based on the type of adjustments that need to be made. Both paths are performed throughout operation of the network switch 600 to balance unicast and broadcast traffic. In one path, at a next step 1008, the CPU 630 calculates the ratio of unicast traffic transmitted by each of the bonded ports of each bonded port set and then compares the calculated ratio to the ratio of the bandwidths of the ports of the bonded port at a step 1010. If the traffic ratio is found to be similar to the ratio of the bandwidths, the network switch 600 proceeds to optional step 1012 to determine whether more bandwidth is needed or desired. This determination may be made in any one of several ways, such as monitoring the queues for the bonded ports or counting the number of dropped packets, if any. If it is desired to increase bandwidth, operation proceeds to step 1014, where the network administrator or manager is alerted. Such alert is made in any one or more of many different ways, such as a message or flag set within the network switch 600 or sent to a management console. The network administrator may respond by adding ports to one or more bonded port sets to relieve the bandwidth problem. From step 1014 or from step 1012 if bandwidth is sufficient, operation returns to step 1002.

Referring back to the step 1010, if the CPU 630 determines that the unicast traffic ratio of the bonded ports is not comparable to the bandwidth ratio of the ports, then operation proceeds to step 1016, where the bonded ports of MAC addresses associated with the bonded port set are reassigned to balance traffic. In particular, the CPU 630 reassigns the bonded ports in the hash table entries to achieve a more even distribution of traffic according to the statistical data gathered at step 1002. Operation then proceeds to optional step 1012 to determine if more bandwidth is necessary.

In a second path, the CPU 630 calculates the ratio of broadcast traffic of the bonded ports at a step 1018 from step 1002. At next step 1020, the CPU 630 determines whether VLAN bit map reassignment should be performed to balance the broadcast traffic through one or more of the bonded port sets. If the VLAN bit maps do not need reassignment, operation proceeds to step 1012, described above. If it is determined at step 1020 that reassignment is desired to more evenly distribute broadcast traffic, operation proceeds to next step 1022 to reassign VLAN bit map settings of bonded ports. Operation then proceeds to step 1012 as described above.

It this manner, traffic through the bonded ports is optionally monitored and the MAC address assignments and/or VLAN bit map assignments are dynamically modified during operation to more evenly distribute traffic.

It is appreciated that a network communication device with bonded ports according to the present invention enables a higher bandwidth capability between any two devices as compared to a single uplink connection. Any number of bonded ports may be included in a bonded link between two devices to increase the available bandwidth by a proportional amount. Each device treats its bonded port set as though it were a single port. Thus, to avoid packet looping, each packet is sent via only one of the bonded ports and packets received at one bonded port are not re-transmitted on another bonded port of the same bonded port set. To achieve the highest bandwidth possible on the bonded link, each communication device distributes traffic on each bonded port as evenly as possible. The traffic distribution depends on the selection criterion for selecting bonded ports, where any one of several methods may be used, such as random, round-robin, etc. The selection of a bonded port to send a packet is made either on a packet by packet basis or by source identifier (MAC address) assignment as previously described. In the assignment embodiment, the traffic may be dynamically monitored and the assignments periodically adjusted to achieve the highest bandwidth on each bonded link.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

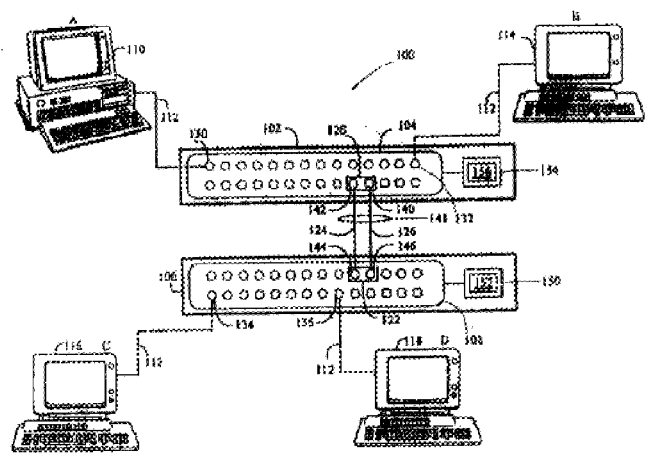

The invention claimed is:

1. A packet-based network system, comprising:
   a first communication device for sending and receiving packets including a first plurality of ports and a first bonded port set including at least two bonded ports;
   a second communication device for sending and receiving packets including a second plurality of ports and a second bonded port set including at least two bonded ports;
   a bonded link coupled between said first and second bonded port sets of said first and second communication devices, said bonded link including a connection line between respective bonded ports of said first and second bonded port sets;
   said first communication device selecting any one of its bonded ports for each packet received by said first communication device to be sent to said second communication device; and
   said second communication device selecting any one of its bonded ports for each packet received by said second communication device to be sent to said first communication device.

2. The network system of claim 1, wherein said first and second communication devices each select bonded ports to send packets so as to evenly distribute packets on said bonded port.

3. The network system of claim 2, wherein said first and second communication devices select bonded ports on a packet by packet basis.

4. The network system of claim 2, each packet including a unique source identifier, wherein said first and second communication devices select bonded ports by assigning a bonded port to each source identifier.

5. The network system of claim 4, wherein:
said first communication device assigns source identifiers received by said first bonded port set to said bonded ports of said first bonded port set on an approximately equal basis;
said first communication device assigns bonded ports among source identifiers received by its non-bonded ports on an approximately equal basis;
said second communication device assigns source identifiers received by said second bonded port set to said bonded ports of said second bonded port set on an approximately equal basis; and
said second communication device assigns bonded ports among source identifiers received by its non-bonded ports on an approximately equal basis.

6. The network system of claim 1, wherein:
said first and second bonded port sets including bonded ports operating at different bandwidths; and
wherein said first and second communication devices select bonded ports to distribute packets sent on each bonded port in proportion to its bandwidth.

7. The network system of claim 1, wherein said first and second communication devices are network switches.

8. The network system of claim 1, further comprising:
a third communication device for sending and receiving packets including a third plurality of ports and a third bonded port set including at least two bonded ports;
said first communication device including a fourth plurality of ports and a fourth bonded port set including at least two bonded ports;
a second bonded link coupled between said third and fourth bonded port sets of said third and first communication devices, said bonded link including a connection link between respective bonded ports of said third and fourth bonded port sets;
for each packet received by said first communication device to be sent to said third communication device, said first communication device selecting any one of its bonded ports; and
for each packet received by said third communication device to be sent to said first communication device, said third communication device selecting any one of its bonded ports.

9. The network system of claim 8, wherein said first, second, third and fourth communication devices are network switches.

* * * * *

UNITED STATES PATENT AND TRADEMARK OFFICE
CERTIFICATE OF CORRECTION

PATENT NO. : 7,333,485 B2  Page 1 of 3
APPLICATION NO. : 10/667649
DATED : February 19, 2008
INVENTOR(S) : Michael L. Witkowski et al.

It is certified that error appears in the above-identified patent and that said Letters Patent is hereby corrected as shown below:

The title page, showing an illustrative figure, should be deleted and substitute therefor the attached title page.

On sheet 1 of 13, in Fig. 1, delete

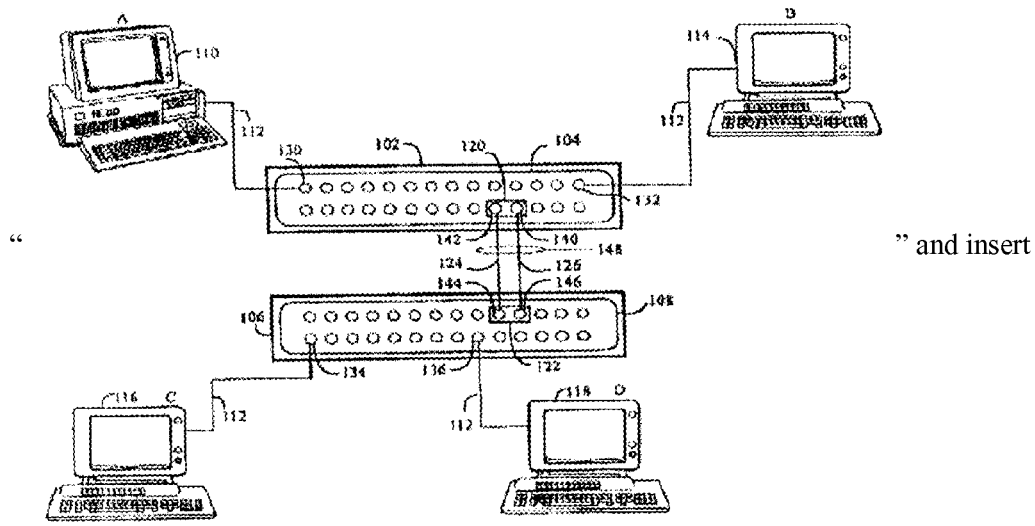

" and insert

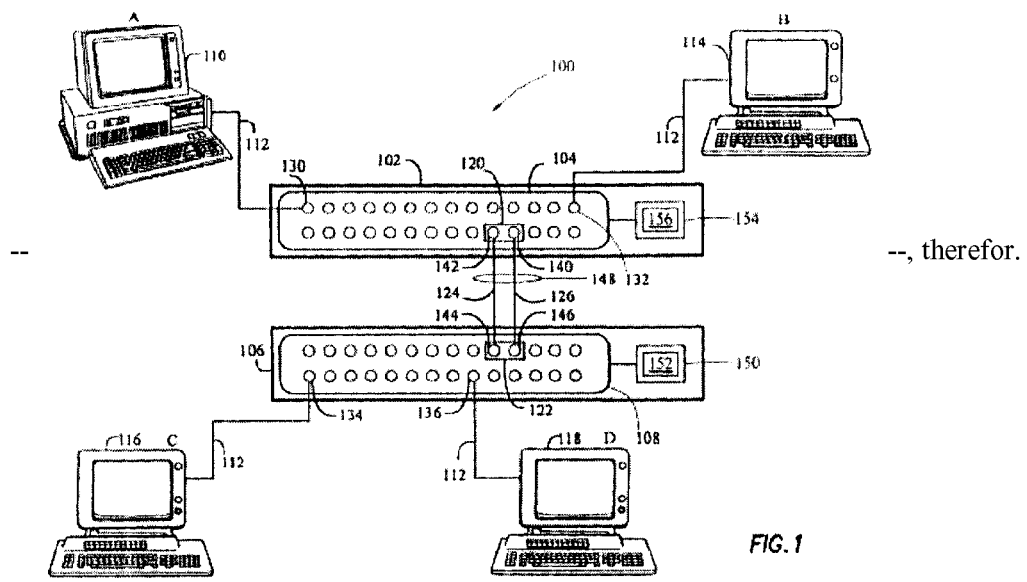

--, therefor.

UNITED STATES PATENT AND TRADEMARK OFFICE
CERTIFICATE OF CORRECTION

PATENT NO. : 7,333,485 B2
APPLICATION NO. : 10/667649
DATED : February 19, 2008
INVENTOR(S) : Michael L. Witkowski et al.

It is certified that error appears in the above-identified patent and that said Letters Patent is hereby corrected as shown below:

In column 24, line 49, in Claim 1, delete "line" and insert -- link --, therefor.

In column 24, line 62, in Claim 2, after "port" insert -- link --.

Signed and Sealed this

First Day of July, 2008

JON W. DUDAS
*Director of the United States Patent and Trademark Office*

(12) United States Patent
Witkowski et al.

(10) Patent No.: US 7,333,485 B2
(45) Date of Patent: Feb. 19, 2008

(54) NETWORK COMMUNICATION DEVICE INCLUDING BONDED PORTS FOR INCREASED BANDWIDTH

(75) Inventors: Michael L. Witkowski, Harris County, TX (US); Dale J. Mayer, Harris County, TX (US); William J. Walker, Harris County, TX (US); Kirk D. Roller, Travis County, TX (US); Patricia E. Hareski, Harris County, TX (US); Gary B. Kotzur, Harris County, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 806 days.

(21) Appl. No.: 10/667,649

(22) Filed: Sep. 22, 2003

(65) Prior Publication Data

US 2004/0068589 A1 Apr. 8, 2004

Related U.S. Application Data

(60) Division of application No. 08/936,072, filed on Sep. 23, 1997, now Pat. No. 6,665,733, which is a continuation-in-part of application No. 08/774,605, filed on Dec. 30, 1996, now Pat. No. 6,260,073.

(51) Int. Cl.
    *H04L 12/28* (2006.01)
(52) U.S. Cl. .................................................. 370/389
(58) Field of Classification Search ............. 370/389; 709/249
    See application file for complete search history

(56) References Cited

U.S. PATENT DOCUMENTS 3,723,973 A   3/1973   Kennedy (Continued)

OTHER PUBLICATIONS

Evaluating Port-Switching Hubs (A reality check for virtual workgroups), Data Comm Lab Test/Port, 8178 Data Communications, No. 9, New York, U.S., Jun. 22, 1993, pp. 52-56, 58, 60, and 62.

*Primary Examiner*—Wing Chan
*Assistant Examiner*—Lawrence J Burrowes

(57) ABSTRACT

A network communication device including port control circuitry for controlling packet flow between the ports of the device, where the port control circuitry includes a port manager that directs packets between the ports and port bonding circuitry that bonds two or more of the ports into a bonded port set. For each packet to be sent via the bonded port set, the port bonding circuitry selects one of the bonded ports for transmitting the packet. More than one bonded port set may be defined in a given communication device, and each bonded port set may include from two ports up to all the ports of the device, as long as each port is included in only one bonded port set. One or more port bonding registers are provided to identify which of the plurality of ports are bonded in each bonded port set. In one embodiment, the bonded ports are selected on a packet by packet basis so as to achieve a relatively even distribution of packets sent by each bonded port. In an alternative embodiment bonded ports are assigned to packet source identifiers so as to achieve a relatively even distribution of source identifiers among the bonded ports. If bonded ports are assigned to particular source identifiers, then the traffic is preferably monitored and the assignments are periodically adjusted to achieve even distribution of packet flow on the bonded link. The bonded ports may have different bandwidths, in which case traffic is distributed on a proportionate basis.

9 Claims, 13 Drawing Sheets